US010242327B2

(12) United States Patent
Kamenov et al.

(10) Patent No.: US 10,242,327 B2
(45) Date of Patent: Mar. 26, 2019

(54) DISCOVERING AND RESERVING TRAVEL SOLUTIONS

(75) Inventors: Dimitar Kamenov, Sofia (BG); Boyan Manev, Sofia (BG); Ivan Goychev, Sofia (BG); Georgi Kremenliev, Sofia (BG)

(73) Assignee: PROS TRAVEL COMMERCE, INC., Austin, TX (US)

( * ) Notice: Subject to any disclaimer, the term of this patent is extended or adjusted under 35 U.S.C. 154(b) by 214 days.

(21) Appl. No.: 13/167,624

(22) Filed: Jun. 23, 2011

(65) Prior Publication Data

US 2012/0123909 A1    May 17, 2012

Related U.S. Application Data

(60) Provisional application No. 61/413,932, filed on Nov. 15, 2010, provisional application No. 61/413,922, filed on Nov. 15, 2010.

(51) Int. Cl.
*G06Q 10/02* (2012.01)
*G06Q 50/14* (2012.01)
*G06Q 30/06* (2012.01)

(52) U.S. Cl.
CPC ......... *G06Q 10/02* (2013.01); *G06Q 30/0641* (2013.01); *G06Q 50/14* (2013.01)

(58) Field of Classification Search
USPC ................ 705/5, 1, 6; 235/384
See application file for complete search history.

(56) References Cited

U.S. PATENT DOCUMENTS

| 6,306,198 | B1 |  | 10/2001 | Corbin |  |
|---|---|---|---|---|---|
| 6,839,679 | B1 | * | 1/2005 | Lynch | G06Q 30/06 705/5 |
| 7,124,089 | B2 | * | 10/2006 | Cornwell | G06Q 10/02 705/5 |
| 2002/0077871 | A1 | * | 6/2002 | Udelhoven | G06Q 10/02 705/5 |
| 2007/0233530 | A1 | * | 10/2007 | Blaszka | G06Q 30/06 705/6 |
| 2008/0041945 | A1 | * | 2/2008 | Williamson | G06Q 30/06 235/384 |
| 2008/0167886 | A1 | * | 7/2008 | Marcken | G06Q 10/02 705/5 |
| 2009/0234681 | A1 | * | 9/2009 | Champernowne | G06Q 10/02 705/5 |
| 2012/0136683 | A1 |  | 5/2012 | Wallace |  |

* cited by examiner

*Primary Examiner* — Oluseye Iwarere
*Assistant Examiner* — Reva R Danzig
(74) *Attorney, Agent, or Firm* — Christensen O'Connor Johnson Kindness PLLC

(57) ABSTRACT

A system and method to facilitate discovery and reservation of travel options suitably include routing processing, flight selection processing, and fare validation processing. Flight selection processing generates flight combinations for each routing discovered by the routing processing. Not all flight combinations are allowed to proceed thus permitting better flight combinations to emerge. Fare validation processing loads fares, checks availability, and validates them according to the specifics associated with each fare. A list of low cost travel solutions is returned to a travel consumer.

21 Claims, 18 Drawing Sheets

DISCOVERING AND RESERVING TRAVEL SOLUTIONS

CROSS-REFERENCES TO RELATED APPLICATIONS

This application claims the benefit of Provisional Application No. 61/413,922 and No. 61/413,932, both filed Nov. 15, 2010, and both of which are incorporated herein by reference.

TECHNICAL FIELD

The present subject matter generally relates to travel, and more particularly, relates to discovering and reserving travel solutions.

BACKGROUND

Online travel search providers have revolutionized the travel industry. Over time, these online travel providers have successfully integrated travel reservation systems to reliably deliver lower fares and realistic itineraries to prospective travelers. Unfortunately, this has transformed the relationships among participants in the travel industry to be less interdependent. Fees once enjoyed by various industry participants have been reduced or eliminated.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

One form of the present subject matter includes a method, which recites a computer-implemented method for a travel request. The method comprises periodically calculating, by a processor node associated with a computer, potential routings and split points for later use in the creation of theoretical travel paths for potential travel itineraries. The method also obtains, by a search node associated with the computer, a travel request having at least one origination and at least one destination. The method additionally creates, by a routing module associated with the search node, at least one theoretical travel path for a travel itinerary based on the travel request. The method generates, by a travel module associated with the search node, travel combinations based on the unique travel routings associated with each theoretical travel path. The method further provides a list of travel itinerary options from the travel combinations in response to the travel request.

DESCRIPTION OF THE DRAWINGS

The foregoing aspects and many of the attendant advantages of this subject matter will become more readily appreciated as the same become better understood by reference to the following detailed description, when taken in conjunction with the accompanying drawings, wherein.

DETAILED DESCRIPTION

The detailed description that follows is expressed in terms of software processes and symbolic representations of operations by hardware computer components, including a processor, memory storage devices for the processor, connected display devices, and input devices. Furthermore, these processes and operations may utilize computer components in a homogenous or heterogeneous distributed computing environment, including remote file servers, computer servers, and memory storage devices. Each of these distributed computing components is accessible by the processor via a communication network. In a heterogeneous computing environment, clients, servers, and client/servers may be, for example, mainframes, minicomputers, workstations, or personal computers.

Figure 1:
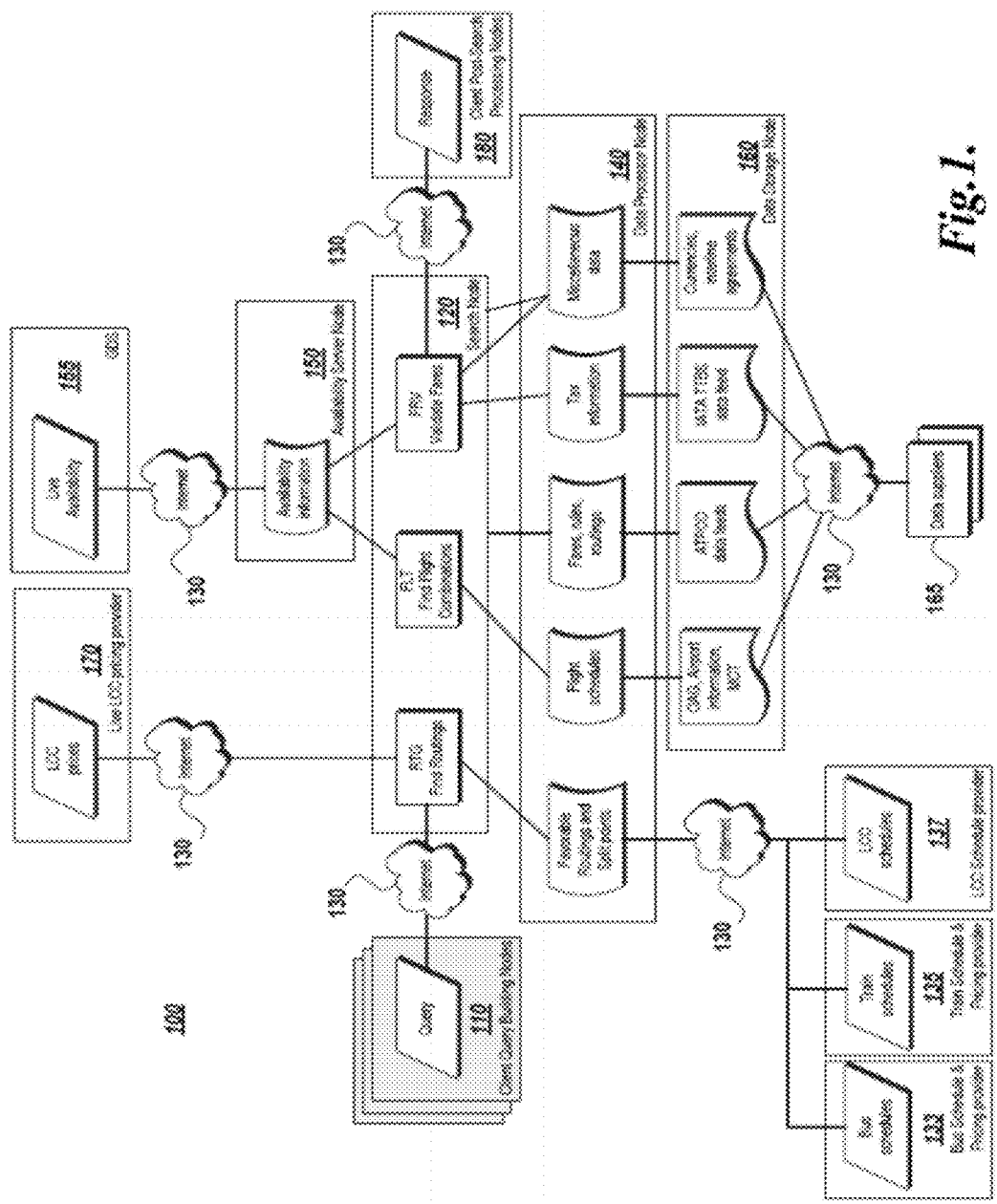
FIG. 1 shows a block diagram view of computer systems in a multi-variable online travel option identification and reservation processing environment 100 in accordance with at least one embodiment.

Referring now to FIG. 1, a block diagram view of computer systems in a multi-variable online travel option identification and reservation processing environment 100 is shown in accordance with at least one embodiment. The environment 100 includes client query building nodes 110, search node 120, data processor node 140, availability server node 150, data storage node 160, and client post-search processing nodes 180. Components in the environment 100 have access to additional data sources via the internet 130 including bus schedule and pricing providers 133, train schedule and pricing providers 135, low cost carrier (LCC) schedule providers 137, global distribution systems (GDS) 155, data suppliers 165, and live LCC pricing providers 170. The data suppliers 165 may provide a variety of information, including data feeds, provided by the Airline Tariff Publishing Company (ATP), the Official Airline Guide (OAG), the International Air Transport Association (IATA), Minimum Connecting Time (MCT), and other travel-related data feeds. In addition, data suppliers may also provide a variety of travel information directly from the source; for example, specific airports may provide information pertaining to weather conditions, tax rates, check-in wait times, layover accommodations, on-time flight performance information, interline agreements, currencies, and exchange rates for foreign fare calculations. Travel information collected from the various data feeds and data suppliers may be stored in computer accessible document form on data storage node 160.

Online travel searches, such as an airfare search, may approach the problem of finding suitable fares in a variety of ways. Most searches start by selecting all flights that have available seats on them and look for fares applicable to the instant search, if any, and price those fares. Alternatively, a search might start with fares and attempt to construct a combination of fares covering the desired travel path and then identify the flights based on the fares.

An alternative approach uses routing numbers, a common characteristic between available fares of a single carrier, as a starting point for each fare search. This search configuration allows precalculation of theoretical travel paths in advance of a particular travel request, thereby significantly reducing the computations needed at the time the travel request is actually made. To accomplish this type of search, search node 120 maintains a list of routings from each carrier covering various travel options. Search node 120, via data processor node 140, periodically generates a list of suitable routings including each origin and destination pair with respective fares. A typical routing listing includes the routing number, minimal fare price when the routing is used, and permitted miles on that routing. In a more advanced form of one embodiment, a routing listing might also include possible left and right add-on routings that may be used in combination with the routing being listed to reach from the origin to the destination with the specified routing. In one embodiment, each routing listing is also associated with a group of fares that may be used on that routing. For example, in one embodiment, a single routing listing might include a plurality of unique fares that may be available with each routing if the rules associated with that fare are satisfied. These fares are often included with a tariff identification number of the fare that can be used with the routing to get from the origin to the destination, the fare type of the fare, and the estimated adult passenger price for the fare. Examples of fare types include published domestic, published international, international arbitrary, private, paper, and low cost fares. Accordingly, the combination of routings and fares forms the basis of an accurate simple travel search. For more complex travel solutions, additional information regarding potential fare combinations is needed. Accordingly, modern tickets are usually a combination of fares, not a single fare.

Both traveler client nodes, namely, client query building nodes 110 and client post-search processing nodes 180, may or may not be colocated on a single client device. In one embodiment, a traveler may place a travel request for travel information on one client device and receive the travel results on another client device. For example, travel results might be accessible from multiple locations in electronic form, such as e-mail or hyperlink. Both traveler client nodes 110, 180 may be connected to search node 120 via the internet 130.

Search node 120 receives travel query data, often in the form of a travel query, from client query building nodes 110. Search node 120 includes a routing process module configured to find matching routings for a received travel query, a travel process module configured to find appropriate travel combinations using the routings matching the travel query, and a validation process module to validate fares of the top travel combinations prior to transmitting response data back to the travel client. Search node 120 is also connected to data processor node 140, availability server node 150, and data storage node 160.

Data processor node 140 includes select stored travel data obtained from data storage node 160 for suitable routings and split points, flight schedules, fares, rules, routings, tax information, and other miscellaneous travel data. The routing module of the search node 120 selectively accesses stored travel data from data storage node 160 relating to suitable routings and split points and associated fares, rules, and routings for the received travel query. The travel module of the search node 120 selectively accesses stored travel data from data storage node 160 relating to flight schedules, associated fares, rules, and routings relating to theoretical travel paths created by the routing module in response to the received travel query. The validation module of the search node 120 selectively accesses stored travel data from data storage node 160 relating to tax information, fares, rules, routings, and other miscellaneous travel data relating to suitable travel combinations generated by the travel module in response to the received travel query.

Availability server node 150 includes stored data reflecting availability of fares for specific flights. The availability server node 150 may obtain live availability data from a variety of providers, including directly from travel providers or via a central reservation system, such as GDS 155, including Sabre, Amadeus, Travelport, and ITA Software. GDS 155, in addition to checking availability, may also allow the travel client to perform a variety of travel related actions, including making ticket reservations, purchasing/selling tickets for multiple airlines, booking hotel rooms, reserving rental cars, and making railway reservations. Both the travel module and the validation module of the search node 120 selectively access stored availability information provided by availability server node 150.

Figure 2:
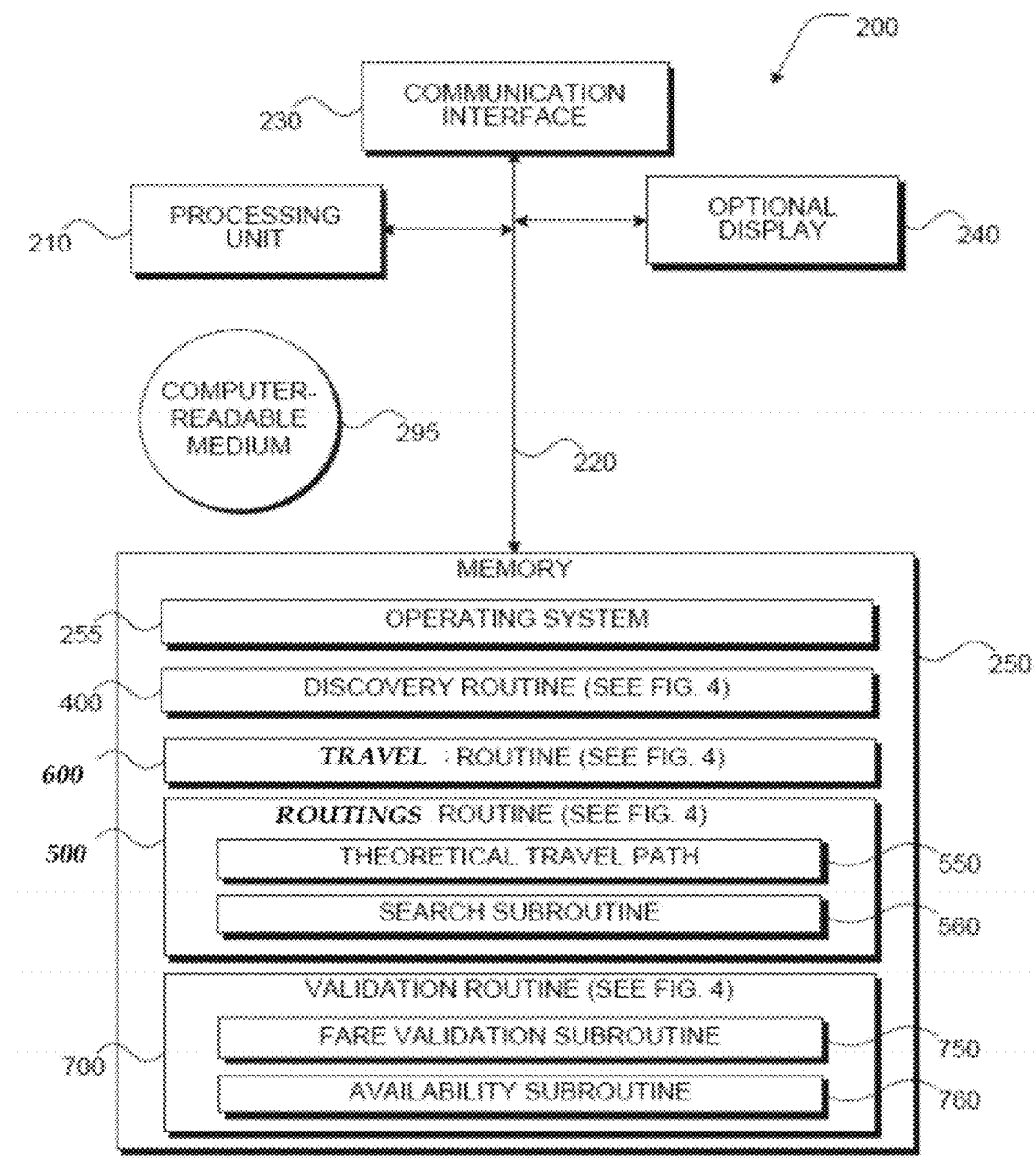
FIG. 2 shows several components of a travel request processing server in accordance with one embodiment.

Referring now to FIG. 2, several components of a travel request processing server 200 are illustrated. In some embodiments, travel request processing server 200 may include many more components than those shown in FIG. 2. However, it is not necessary that all of these general components be shown in order to disclose an illustrative embodiment. As shown in FIG. 2, the travel request processing server 200 includes a communication interface 230 for connecting to a network, e.g., the internet 130. The travel request processing server 200 also includes a processing unit 210, memory 250, and an optional display 240, all interconnected along with the communication interface 230 via a bus 220. The memory 250 generally comprises a random access memory ("RAM"), read only memory ("ROM"), and a permanent mass storage device, such as a disk drive.

The memory 250 stores program code for a travel graph discovery routine 400 for periodically calculating potential routings and available split points, a routings routine 500 for determining unique travel routings and fares for requested travel, a travel routine 600 for generating travel combinations from available travel routings, and a validation routine 700 for checking fares and availability for each travel combination. In addition, the memory 250 also stores an operating system 255. The discovery routine 400 includes a routing generation subroutine. The routing routine 500 includes a theoretical travel path subroutine 550 for creating at least one theoretical travel path along a travel graph for inclusion in a proposed travel itinerary and a search subroutine 560 for identifying routings. The validation routine 700 includes a fare validation subroutine 750 and an availability subroutine 760. These software components may be loaded from a non-transient computer readable storage medium 295, on which the software components are tangibly embodied, into memory 250 of the travel request processing server 200 using a drive mechanism (not shown) associated with a computer-readable storage medium, such as a floppy disk, tape, DVD/CD-ROM drive, memory card, or the like. In some embodiments, software components may also be loaded via the communication interface 230, rather than via a computer readable storage medium 295.

These travel related services may be configured so that any computer connected to the internet 130 is potentially connected to the group of travel applications, processing units, databases, and files or at the very least is able to submit travel requests and/or access travel results. In this manner, the travel request processing server 200 may be accessible in a variety of ways by a variety of client devices, for example, a personal computer, a game console, a set-top box, a handheld computer, a cell phone, or any other device that is capable of accessing the internet 130.

Although one embodiment of a travel request processing server 200 has been described that generally conforms to general-purpose computing devices, a travel request server 200 may be any of a great number of devices capable of communicating with other network capable devices. Accordingly, in one embodiment, the travel request processing server 200 may be a dedicated server. In another embodiment, the travel request processing server 200 may be a distributed server, such a cloud travel server (e.g., 300, 400 as described below) providing computational resources on demand via a network. Available cloud resources may include applications, processing units, databases, and file services. In this manner, the travel request processing server 200 enables convenient, on-demand network access to a shared pool of configurable travel related computing services and resources (e.g., networks, servers, storage, applications, and services) that can be rapidly provisioned and released with minimal management effort or service provider interaction. Accordingly, one embodiment, deploying a cloud travel server, may utilize two different computing entities, a front-end server 310A and a back-end server 410B.

Figure 3:
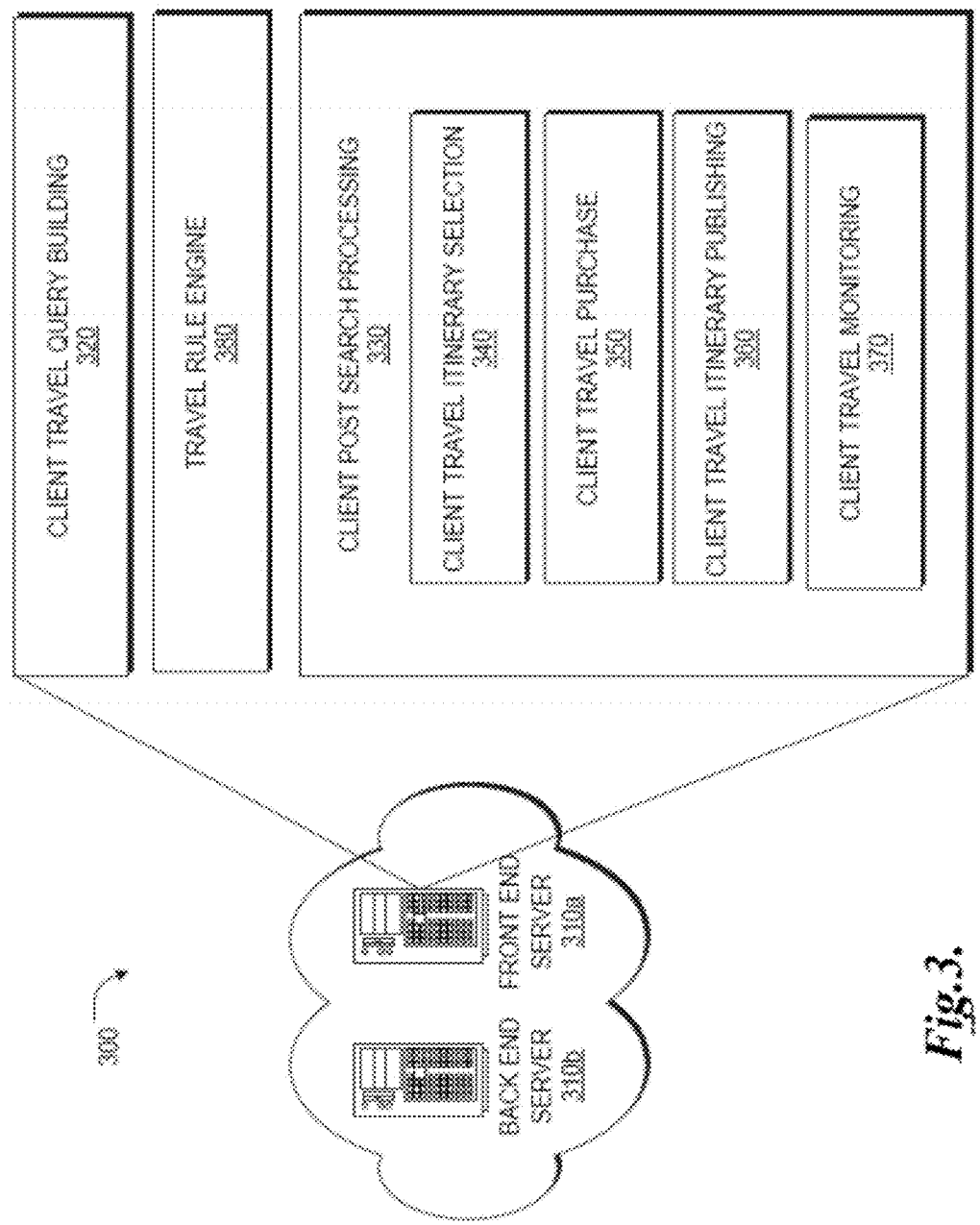
FIG. 3 shows several components of a distributed travel request processing front end server in accordance with one embodiment.

Referring now to FIG. 3 (and referentially to FIG. 4), several components of a distributed travel request processing front end server 310A, 410A of a cloud travel server 300, 400 are shown in accordance with one embodiment. The front-end server 310A, 410A or cloud controller or controller cluster manages in the midst of the cloud; specifically, the front-end server 310A, 410A handles client interactions with the distributed server. The configurable nature of a cloud server 300, 400 is particularly useful in certain embodiments, particularly as front-end server 310A, 410A provides the ability scale horizontally. In essence, the number of users making travel requests will not significantly affect the overall performance of a cloud server configuration as any increase may be offset by load balancing over many web server front ends. In one embodiment, a template of front-end server 310A, 410A may be used to activate additional identical front end cloud servers, which may then be used for load balancing.

The distributed travel request processing front end server 310A, 410A includes client travel query building module 320, travel rule engine 380, and client post-search processing module 330. Client travel query building module 320 receives query data, often in the form of a travel query, from a variety of client query building nodes 110.

Once the resulting travel combinations have been discovered, sorted, and availability confirmed and validated the results are returned to the travel client via client post-search processing module 390. Client travel itinerary selection subroutine 340 enables the traveler to select and/or reserve at least one of the proposed travel combinations. Client travel purchase subroutine 350 enables the traveler to purchase selected travel combinations. Client travel itinerary publishing subroutine 360 publishes the selected and/or purchased travel combinations to individuals identified by the traveler. Client travel monitoring subroutine 370 may review components of the selected or purchased flight for changes in availability, price, departure/arrival time, and related flight conditions (delay/cancellation). In one embodiment, client travel monitoring subroutine 370 provides reminders for upcoming flights including online check-in notification 24 hours before the flight, recommended on-site arrival times, and existing traveler/passenger regulations. In some embodiments, travel reminders may also include related travel information collected directly from the source, for example specific airports may provide information pertaining to existing weather conditions, tax rates, check-in wait times, layover accommodations, on-time flight performance information, interline agreements, currencies, and exchange rates.

Figure 4:
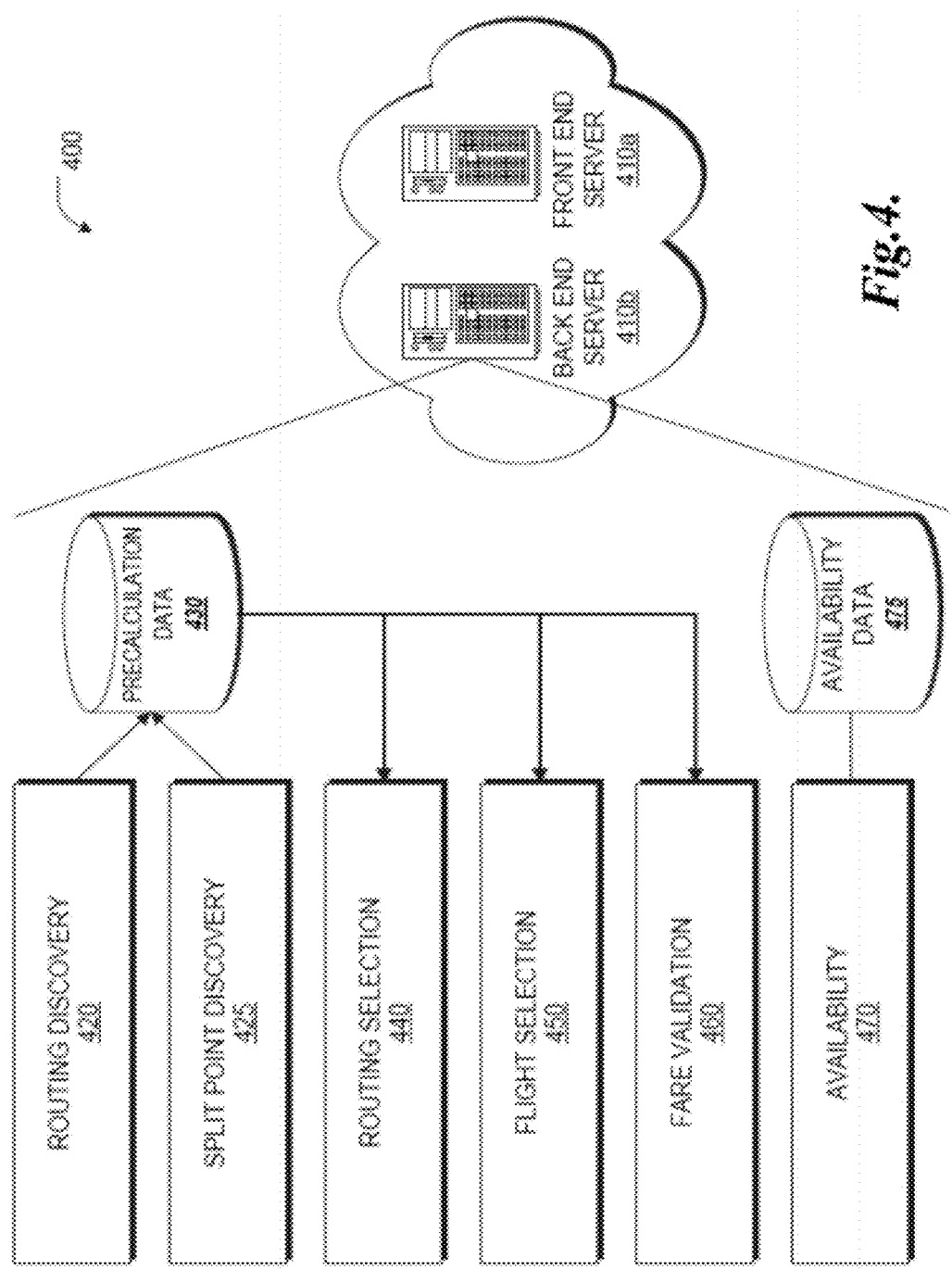
FIG. 4 shows several components of a distributed travel request processing back end server in accordance with one embodiment.

Referring now to FIG. 4 (and referentially to FIG. 3), several components of a distributed travel request processing back end server 410B, 310B of a cloud travel server 400, 300 are shown in accordance with one embodiment. The back-end server 410B, 310B provides access for the controller nodes, storage for database information, and processing power. Accordingly, since the routing discovery routine 420 and split point discovery routine 425 are processing, computing power may be periodically added to back-end server 410B, 310B when the routines are being performed. During these "discovery" periods, the back-end server 410B, 310B may temporarily allocate additional computing power dedicated to the generation of the routing database and split point database. The resulting pre-calculation data 430 may be used repeatedly by the routing selection routine 440, flight selection routine 450, and fare validation routine 460. Accordingly, additional memory resources may be allocated by the back-end server 410B, 310B to cache portions of the pre-calculation data 430 and thereby improve performance.

Routing selection routine 440 creates at least one theoretical travel path for a travel itinerary based on the travel request. Each theoretical travel path uses a combination of at least one travel template and at least one of the origination and the destination; the travel template includes a travel origination field including either the origin or destination, split point placeholders, and types of pricing units. Routing selection routine 440 obtains pre-calculated split points associated with specific travel paths and determines unique travel routings and fares along each respective theoretical travel path based on pre-calculated routings associated with each split point. Based on these unique travel routings, routing selection routine 440 identifies and selects a portion of the available routings for the specific travel segments to represent the cheapest routings. Once a group of suitable cheap routings has been identified for a specific travel combination, routing selection routine 440 may further identify and select a portion to represent the cheapest tariffs from within that group. Once unique travel combinations have been made using travel routings and fares, flight selection routine 450 selects a group of suitable flights to cover these fare constructions.

The fare validation routine 460 and availability routine 470 work together to check whether suitable flights identified by the routing selection routine 440 match travel rules associated with the fares. The fare validation routine 460 validates suitable fares and/or flights for each travel combination of each potential path and removes invalid travel combinations for specific travel dates. Travel combinations may be invalid for a variety of reasons including rules and restrictions imposed on the fare by the travel provider. The availability routine 470 determines whether all unique flight combinations previously identified remain viable travel options. Availability of particular travel combinations may change for a variety of reasons including sell-out of seats at the designated fare, flight cancellation, or other dynamic status changes that need to be checked.

Particular embodiments of the routing selection routine 440, flight selection routine 450, fare validation routine 460, and availability routine 470 are described in greater detail below with regard to FIG. 5, FIG. 6, FIGS. 8A-8E, and FIGS. 9A-9F.

Figure 5:
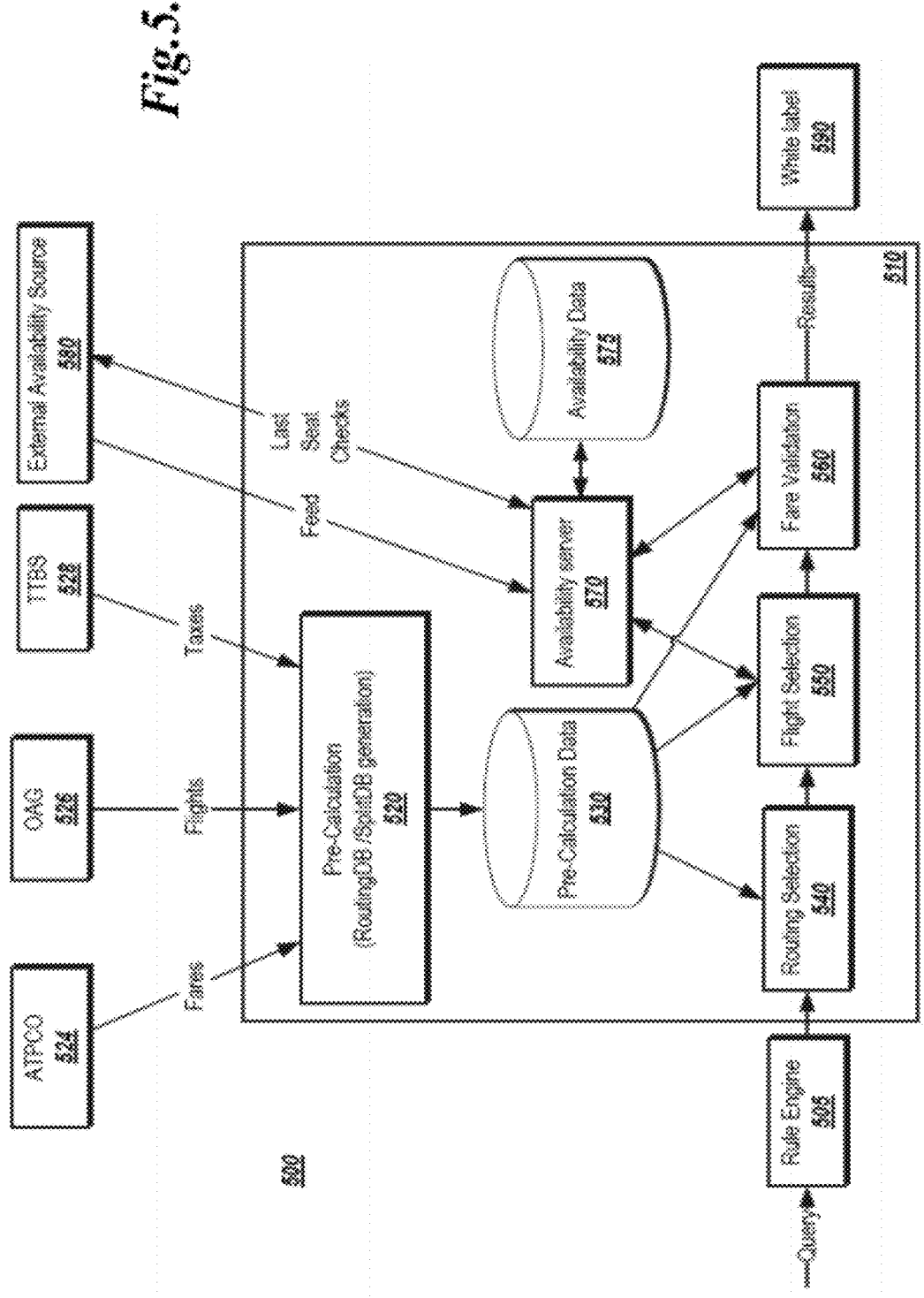
FIG. 5 shows system interaction for travel data discovery, selection, and validation in accordance with one embodiment.

Referring now to FIG. 5, system interaction for a travel system 500 implementing travel data discovery, selection, and validation is shown in accordance with one embodiment. The travel system 500 includes rule engine 505, travel server 510, white label interface 590, and multiple third party information sources including Airline Tariff Publishing Company (ATPCO) 524, OAG 526, Ticket Tax Box Service (TTBS) 528, and external availability sources 580. The travel server 510 includes a pre-calculation generator 520 to generate pre-calculation data 530, which includes a routing database and a split point database. Travel server 510 uses the pre-calculation data 530 to conduct routing selection 540 searches and to make flight selection 550 suggestions for a received query. In one embodiment, the travel server 510 provides fare validation 560 of selected flights and routes via availability server 570 using availability data 575 and information received from external availability sources 580.

ATPCO 524 collects and distributes fare and fare-related data for the airline and travel industries. ATPCO 524 also serves as the airfare data provider for several airlines worldwide, which together represent a majority of scheduled commercial air travel. Fare information from all these airlines is also sent to another set of ATPCO customers, including the major global distribution systems (e.g., Sabre, Amadeus, Travelport, and ITA Software) and other computer reservation systems that use airfare data from ATPCO 524 to issue tickets. In addition, collected fare information is also reported by ATPCO 524 to travel agencies, airlines, cargo carriers, governments, and travel industry organizations. In one embodiment, travel server 510 also receives fare and fare-related data from another source, instead of or in combination with ATPCO 524.

OAG 526 provides aviation information and analytical services sourced from proprietary databases tracking a variety of travel information including airline schedules, flight status, fleet, Maintenance, Repair and Overhaul (MRO), and cargo logistics. An independent provider of travel information products and services, OAG 526 offers a variety of market intelligence on aircraft fleets, capacity supply, traffic demand, financial and operating performance, airline schedules distribution, real time flight status information, timetables, codeshare synchronization, and MRO forecasting. In one embodiment, travel server 510 also receives flight information from another source, instead of or in combination with OAG 526.

TTBS 528 provides a travel server 510 with access to all taxes, charges, and fees applied on passenger air transportation. In one embodiment, the travel server 510 stores tax information separately as a component of a fare. In this manner, taxes may be added individually to each path so that the resulting price is the sum of all fares in the path plus any IATA taxes associated with each of the cities in the path. In one embodiment, tax updates are manually input to the travel server 510. Tax updates are altered infrequently relative to fare prices, and often these changes are unpredictable since each tax entity may have its own schedule for making tax adjustments. Potential taxing entities may include airport, city, county, state, country, province, region, department, prefecture, district, township, town, borough, parish, municipality, shire, village, and other administrative and regulatory agencies with authority to levy taxes or impose fees on the travel industry or affiliated ports of travel. In one embodiment, travel server 510 also receives tax information from another source, instead of or in combination with TTBS 528.

The travel server 510 includes a pre-calculation generator 520 to periodically compose a list of fares that cover each Origin and Destination pair (O&D) that can be reached with available flights. From the list of fares, sorted by price, travel server 510 extracts the more applicable unique routings. In one embodiment, the list of fares may include a database storing up to a variety of distinctive fares for each routing. For example, Table 1 shows a truncated list for round-trip travel in economy class between Sofia, Bulgaria and Seattle, Wash.:

TABLE 1

Truncated Routings List for Travel between Sofia, Bulgaria and Seattle, Washington

| Routing Number | Add-on Combination | | MIN Fare Price | MAX Miles |
| --- | --- | --- | --- | --- |
| | Left | Right | | |
| 001BA 2396 | — | 0073 | 297 | mpm: 7045 |
| 01UA 0406 | — | — | 298 | mpm: 7045 |
| 001LH 0406 | — | — | 298 | mpm: 7045 |
| 001CO 0406 | — | — | 298 | mpm: 7045 |
| 001AC 0406 | — | — | 324 | mpm: 7045 |

Each entry in the list may include a routing number (e.g., "001ba 2396"), add-on combination identifications for both left and right add-ons, the minimal fare price when this routing is used (e.g., "297" for that specific combination), and the maximum permitted miles on that routing (e.g., "7045" miles). In one embodiment, add-on combinations (e.g., "- - - 0073" indicating only a right add-on) are included when they are to be used to reach from the origin to the destination with the specified routing at a particular fare and/or price. In one embodiment, the maximum permitted miles on each routing is relatively proportionate to the actual miles to be traveled for travel between origin and destination along a particular routing. In another embodiment, the maximum permitted miles on a particular routing is related to the travel range of the aircraft currently assigned to the routings.

Table 2 shows the top two routings from Table 1 along with their associated fares:

TABLE 2

Partial List of Routings plus Fares for Travel between Sofia, Bulgaria and Seattle, Washington

| Routing Number | Tariff Number | Fare Type | Adult Fare Price |
| --- | --- | --- | --- |
| 001BA 2396----0073 | 739502 | 0 | 297 |
| | 213231 | 0 | 351 |
| | 213132 | 0 | 442 |
| | 213218 | 0 | 450 |
| | 213151 | 0 | 489 |
| 001UA 0406-------- | 2948466 | 0 | 298 |
| | 2711482 | 0 | 331 |
| | 2711486 | 0 | 371 |
| | 2711481 | 0 | 424 |

Each entry in the list of Table 2 may include a routing number with add-ons (e.g., "001ba 2396 - - - 0073"), a subset listing the tariff number of each fare that can be used with this routing to get from the origin to the destination (e.g., "739502"), the fare type of each fare, and the estimated adult passenger price for each fare (e.g., "297"). In one embodiment, travel server 510 distinguishes a variety of the fare types including the following: published domestic, published international, international arbitrary, private, paper, and low cost fares.

In one embodiment, these lists are periodically refreshed to confirm or modify the information. To maintain accuracy, portions of the pre-calculated data 530 may be generated whenever new information is obtained by the travel server 510. For example, in one embodiment, daily generation of the routings database and the split point database may still produce satisfactory results as most travel vendors infrequently update fare information and flight plans. In contrast, availability of listed fares is often validated by the availability server 570 more frequently, especially as booking classes may be sold out.

Figure 6:
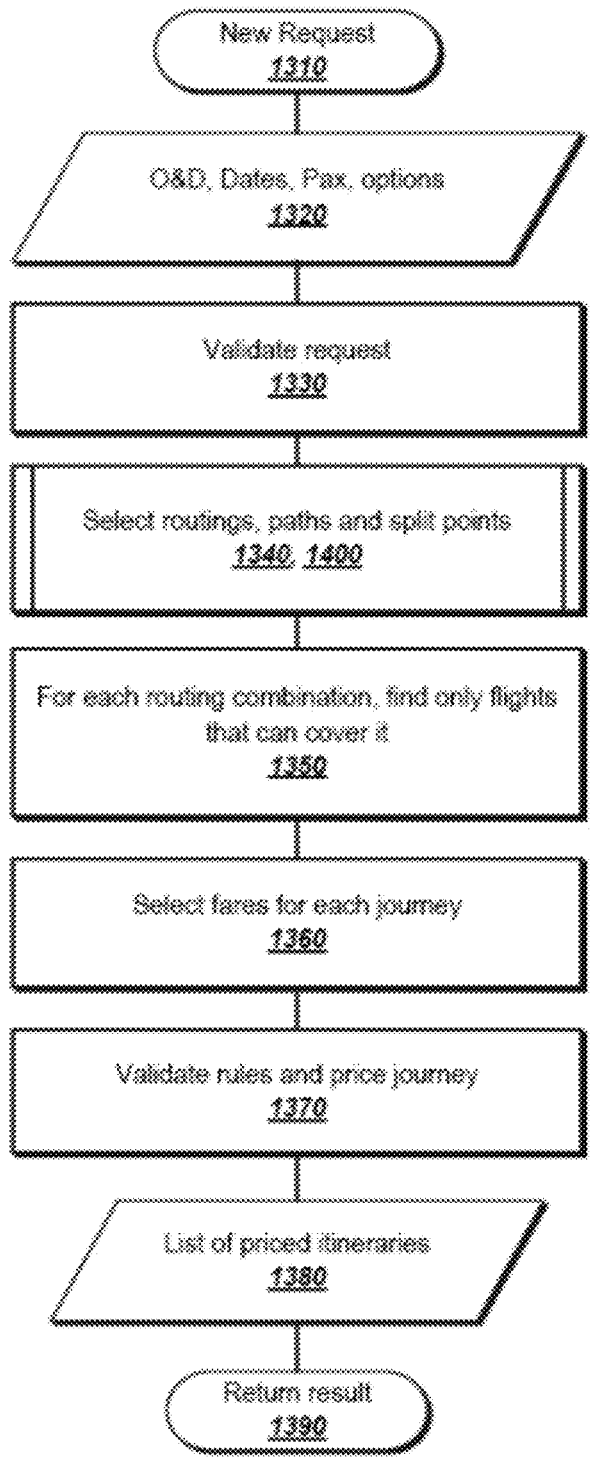
FIG. 6 shows a flow diagram for travel request processing in accordance with one embodiment.

Referring now to FIG. 6, a flow diagram for travel request processing is shown in accordance with one embodiment. The travel request processing routine 1300 illustrates creation of priced travel options based on a travel request. In one approach, the routine 1300 uses a common property between each of the fares of a single carrier to improve the speed and quality of search. More specifically, routine 1300 may use the carrier assigned routing number as a starting point of each fare search. To do that, the routine 1300 needs access to a list of routings from the carriers that are capable of covering each and every search that will ever be searched. In one embodiment, this list of routings is available to the routine 1300 via the precalculated data (e.g., 430, 530).

In block 1310, a new travel request is received by the routine 1300. Routine 1300 obtains a travel request 1320 which may include information pertaining to origination, destination, travel dates (including departure and return), passenger information (including the number of passengers), and a variety of other travel options. Some travel options may include split point preferences, layover parameters, plane size requests, special needs such as food allergies or diet restrictions, and meal preferences. In subroutine block 1330, routine 1300 validates the travel request. This validation is checking whether the travel consumer has the right to do the search requested, or whether they have the right to use the data requested, the tickets their suppliers can issue, and so on.

Figure 7:
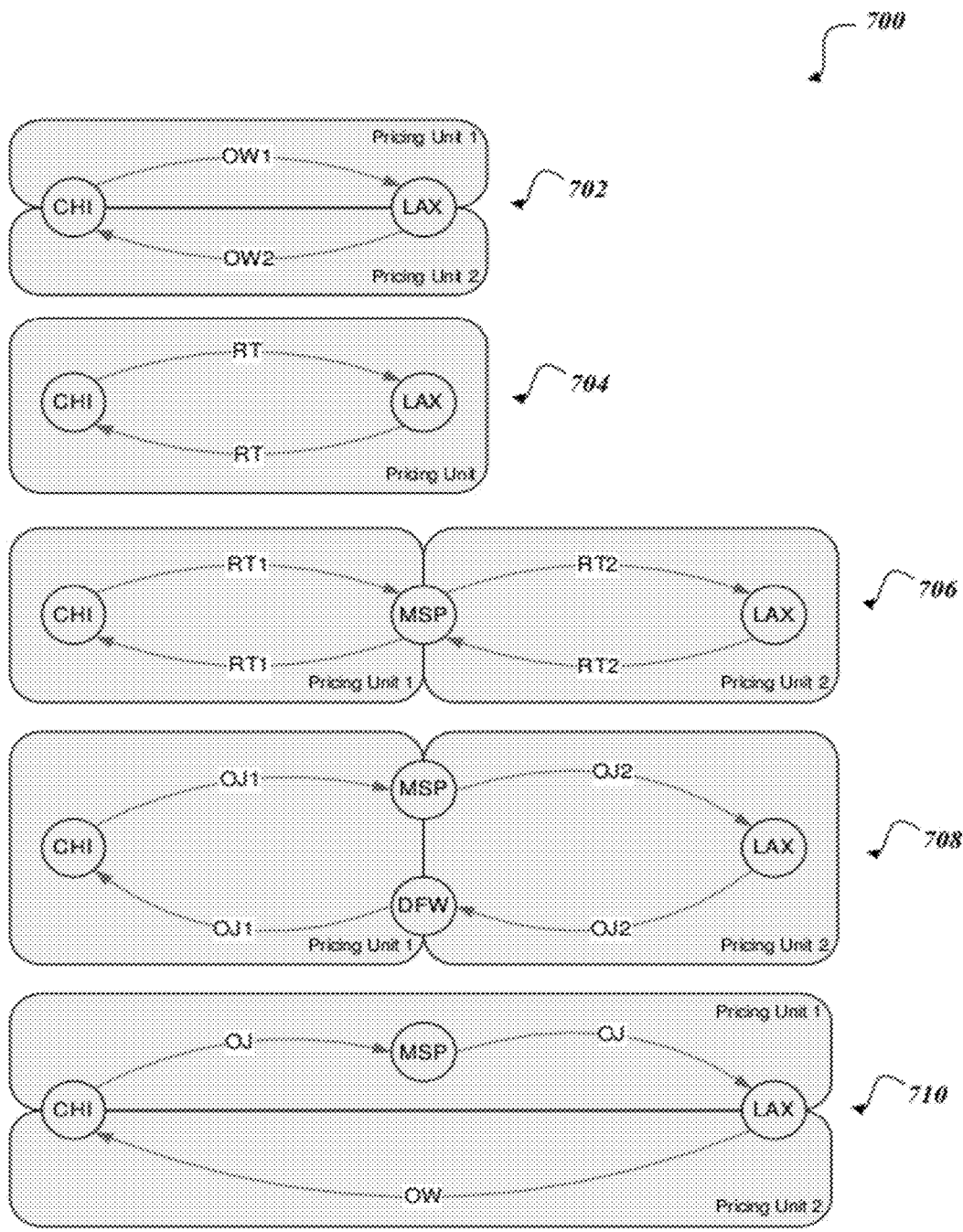
FIG. 7 shows pictorial diagrams illustrating example outputs of a routing process in accordance with one embodiment.
Figure 8A:
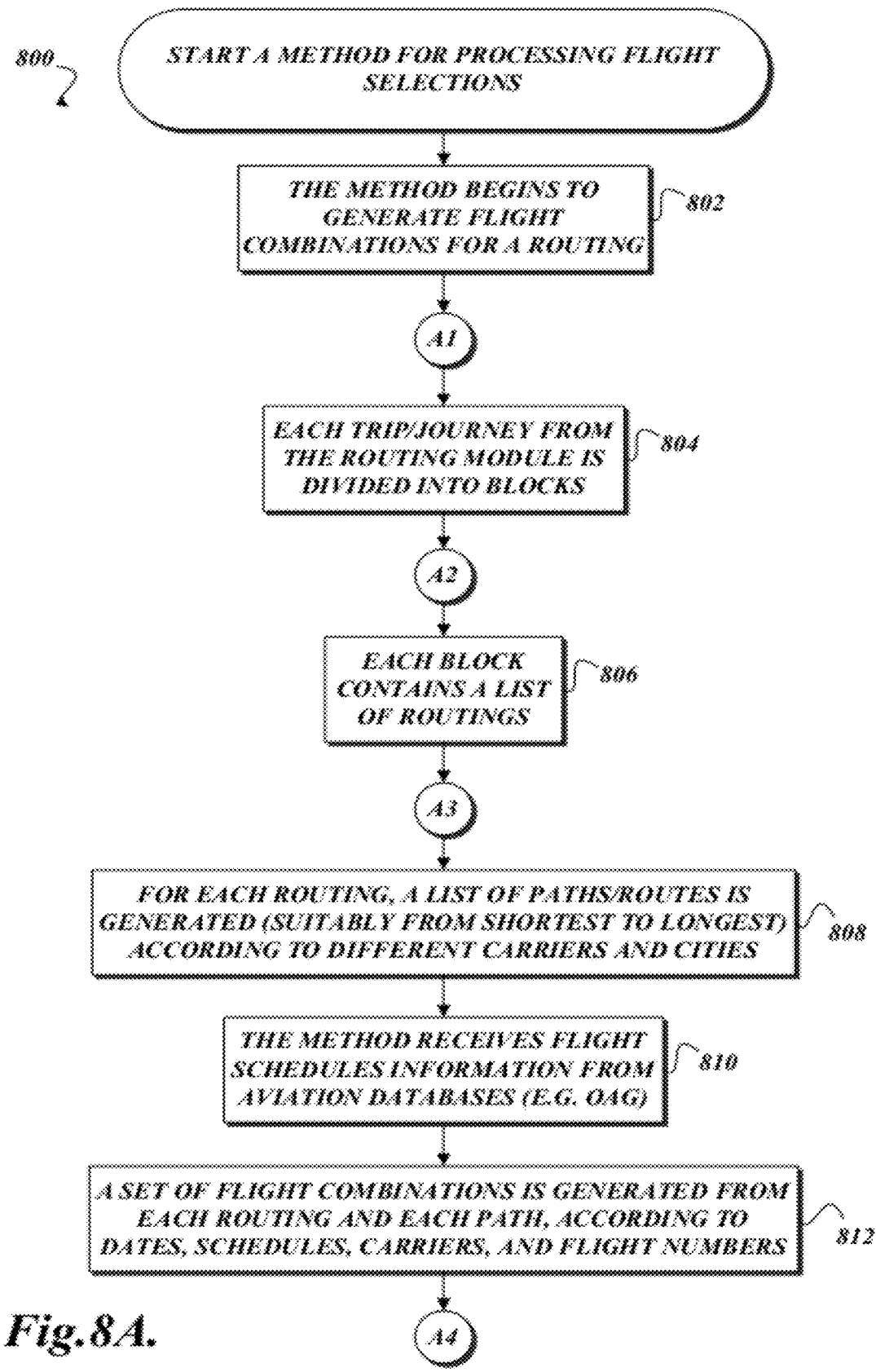
FIGS. 8A-8C and 8E show a process diagram illustrating a method for processing flight selections in accordance with one embodiment.
Figure 8B:
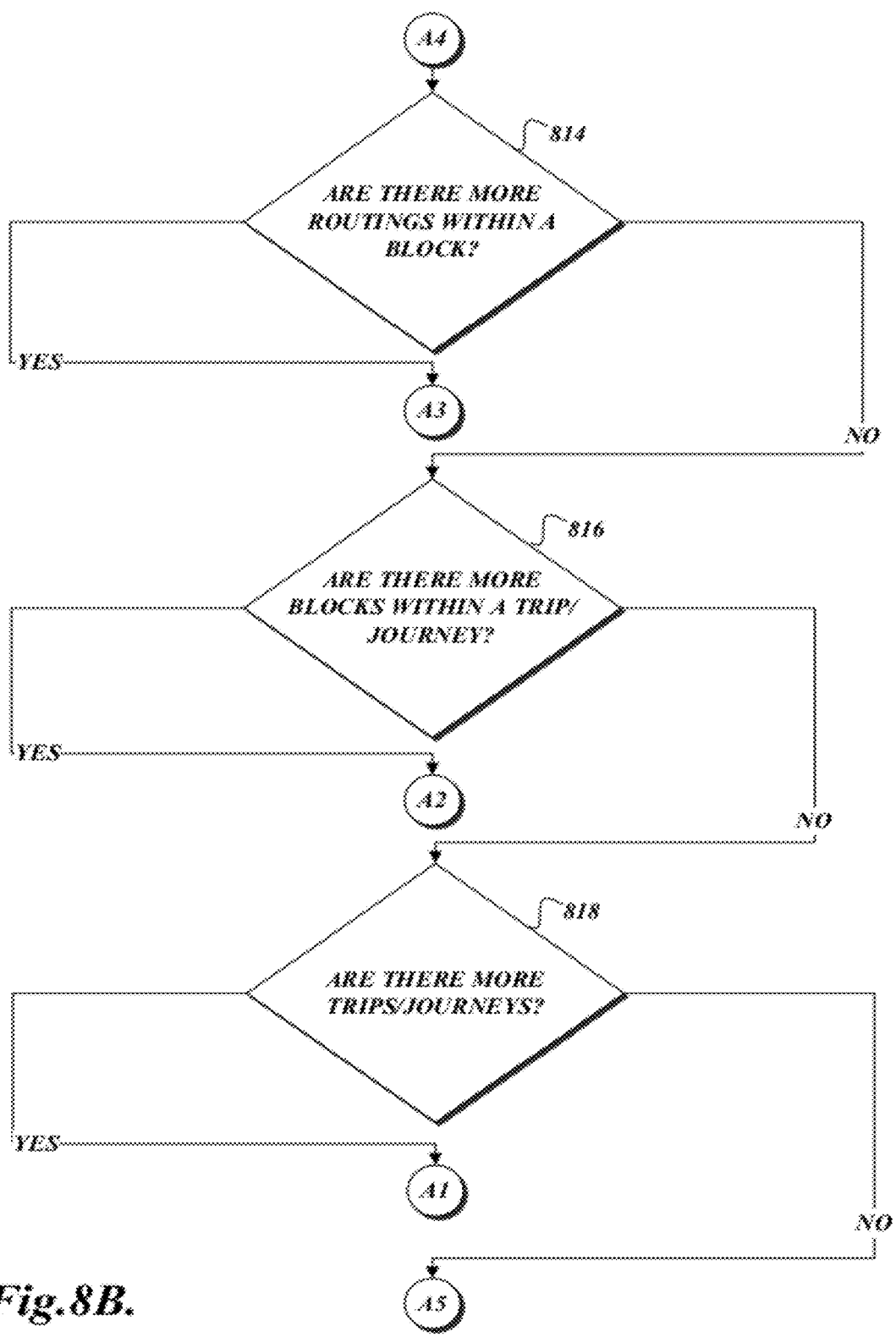
Figure 8C:
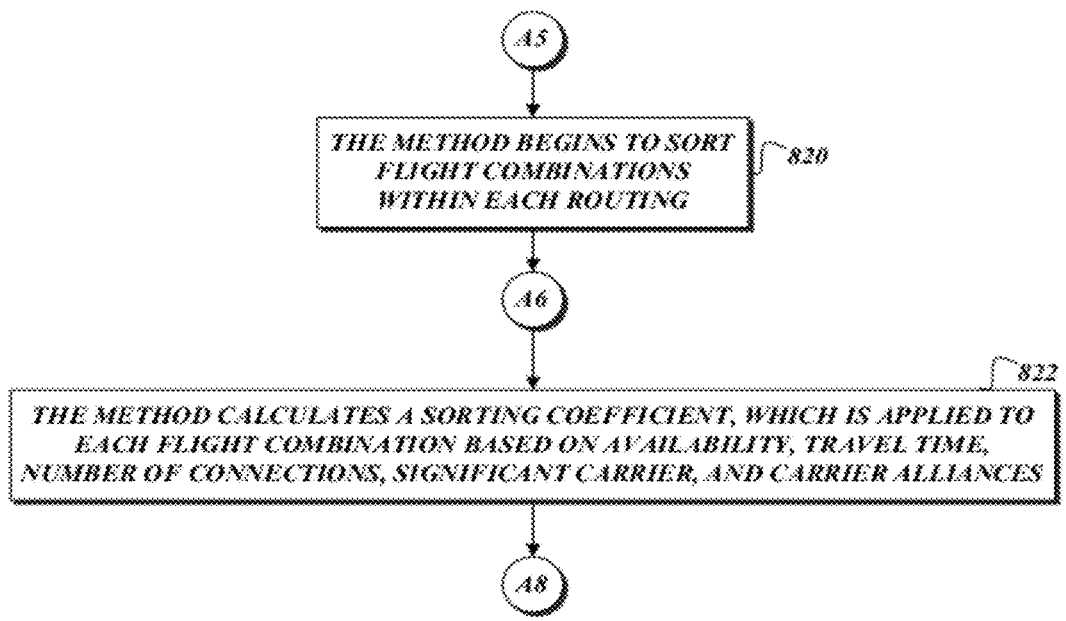
Figure 8E:
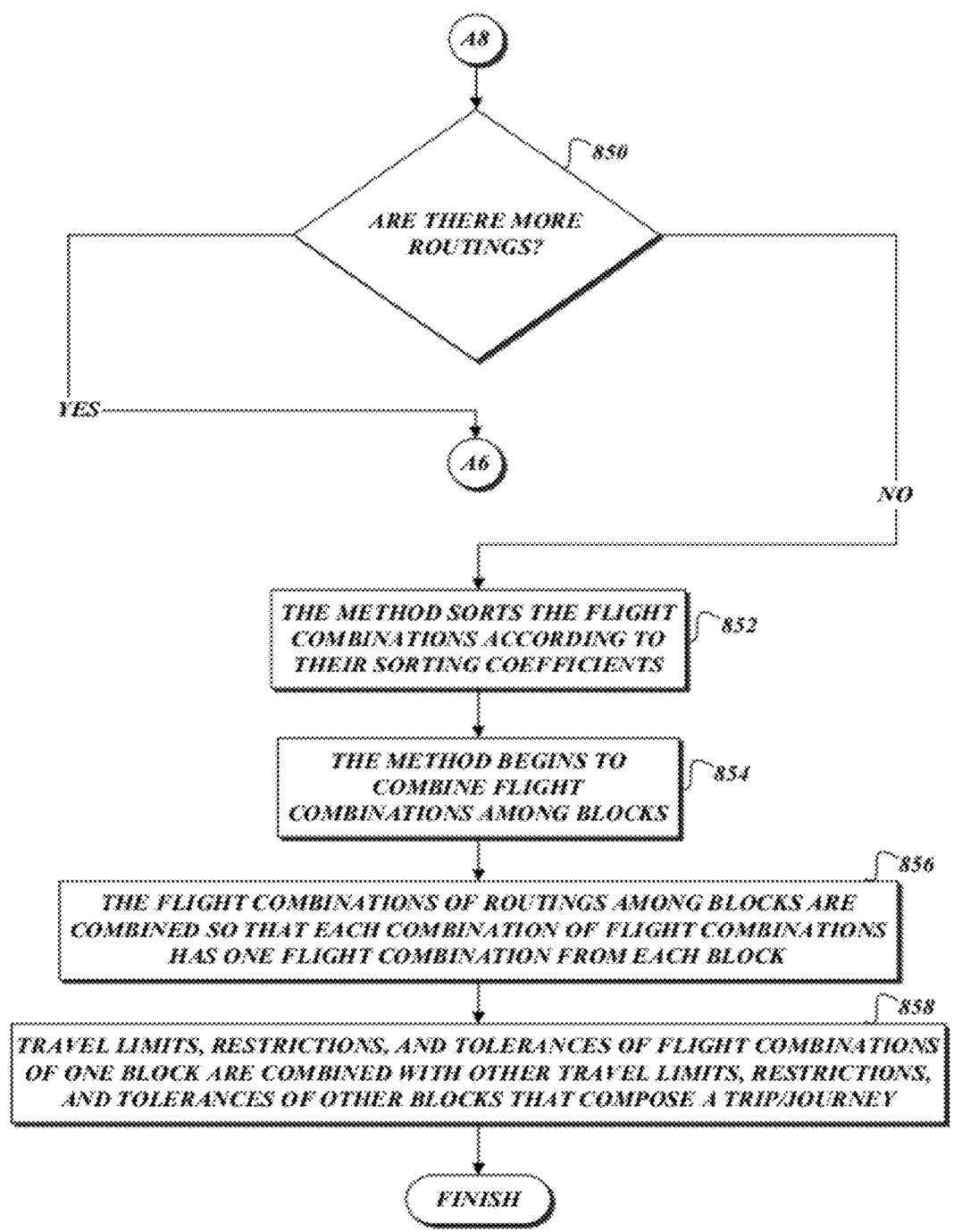
Figure 9A:
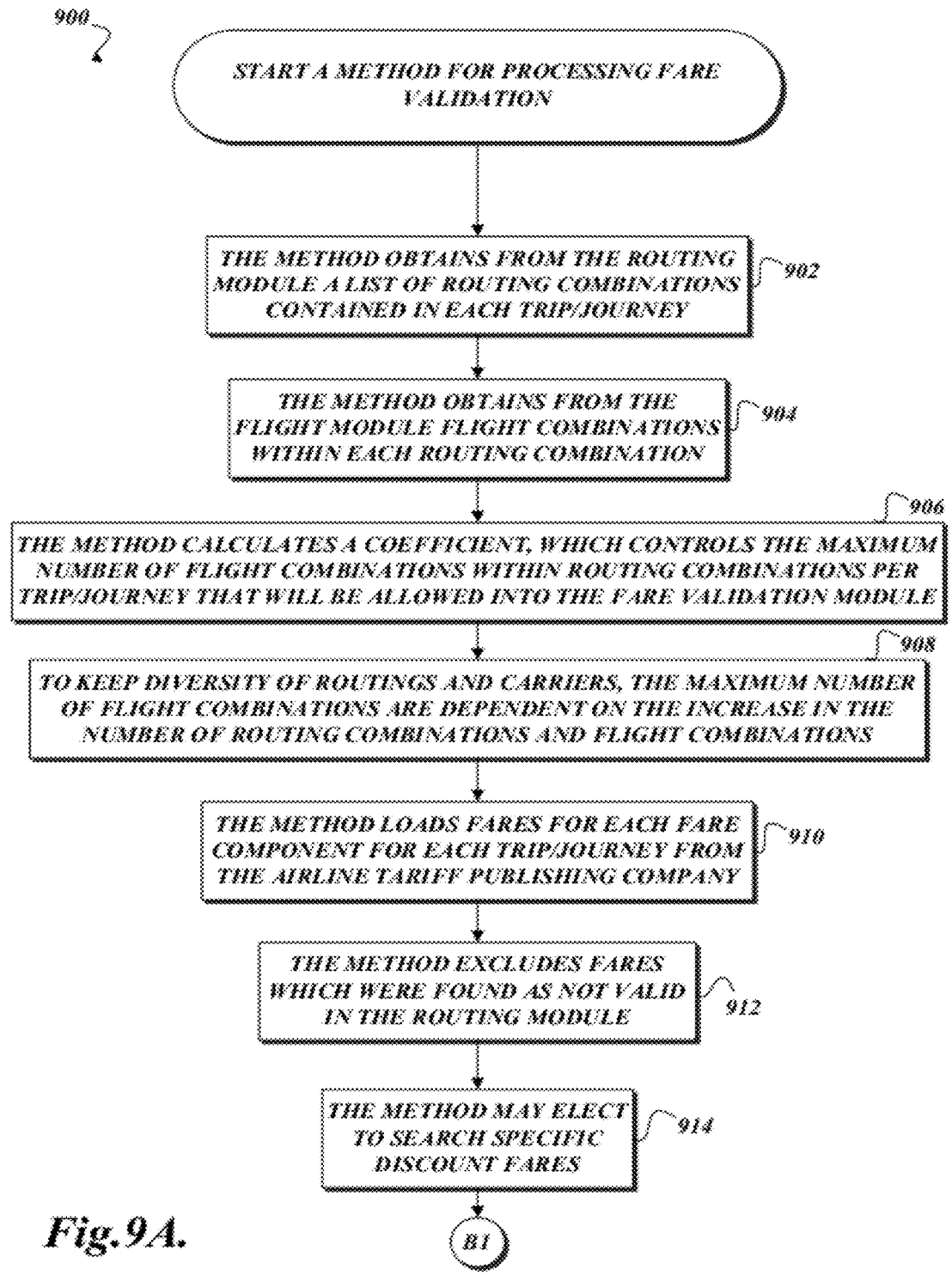
FIGS. 9A-9F show a process diagram illustrating a method for processing fare validation in accordance with one embodiment.
Figure 9B:
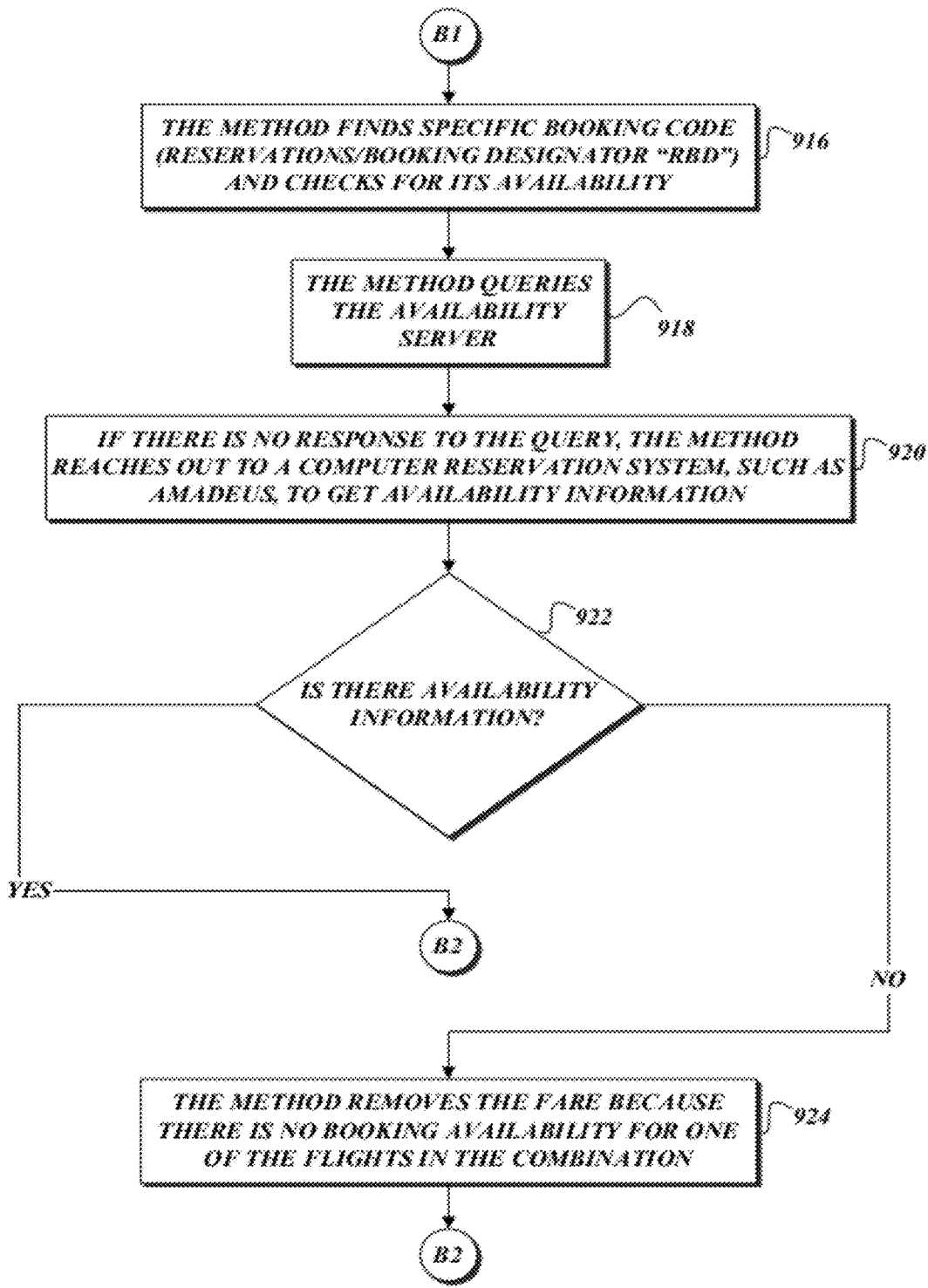
Figure 9C:
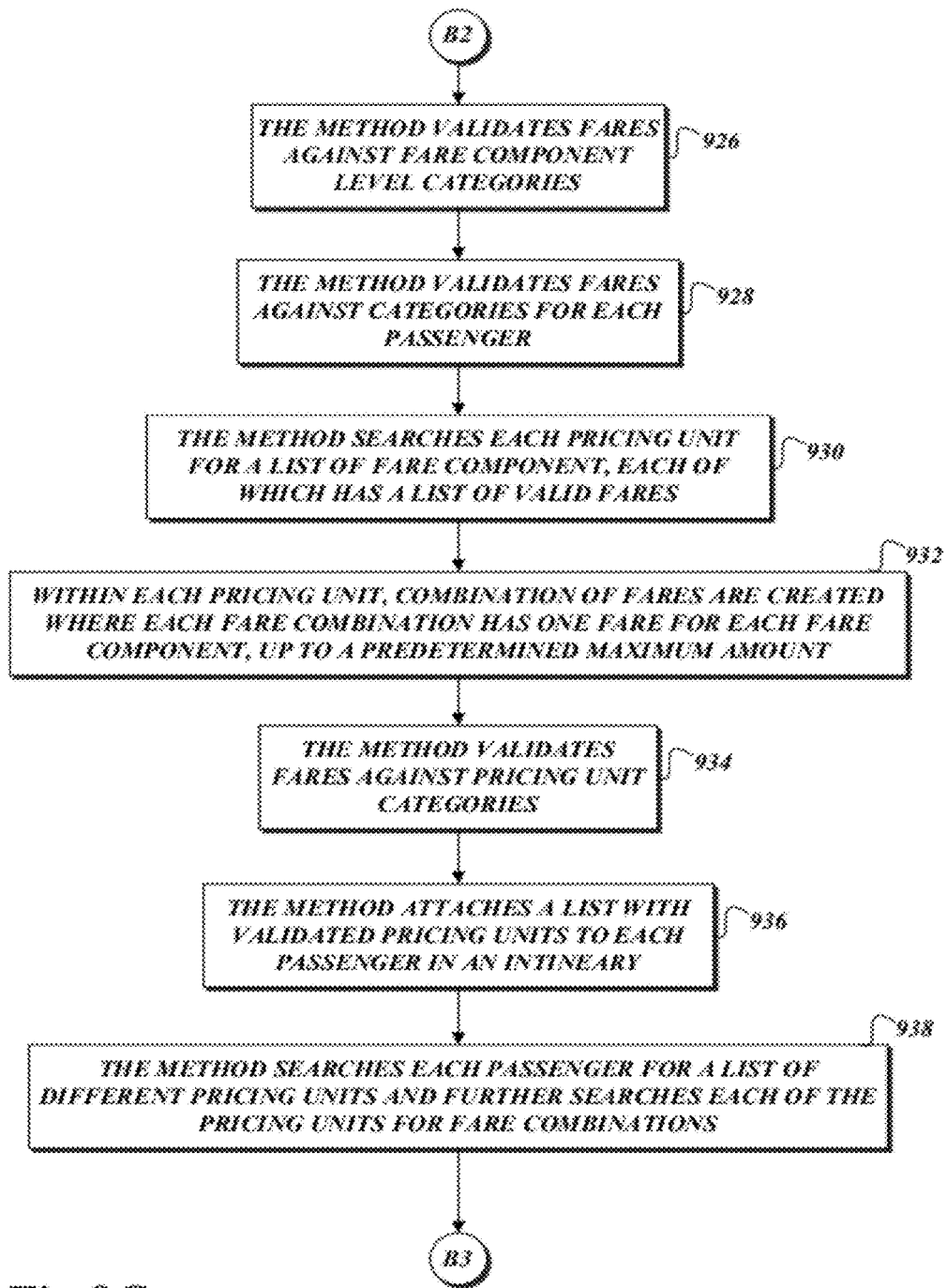
Figure 9D:
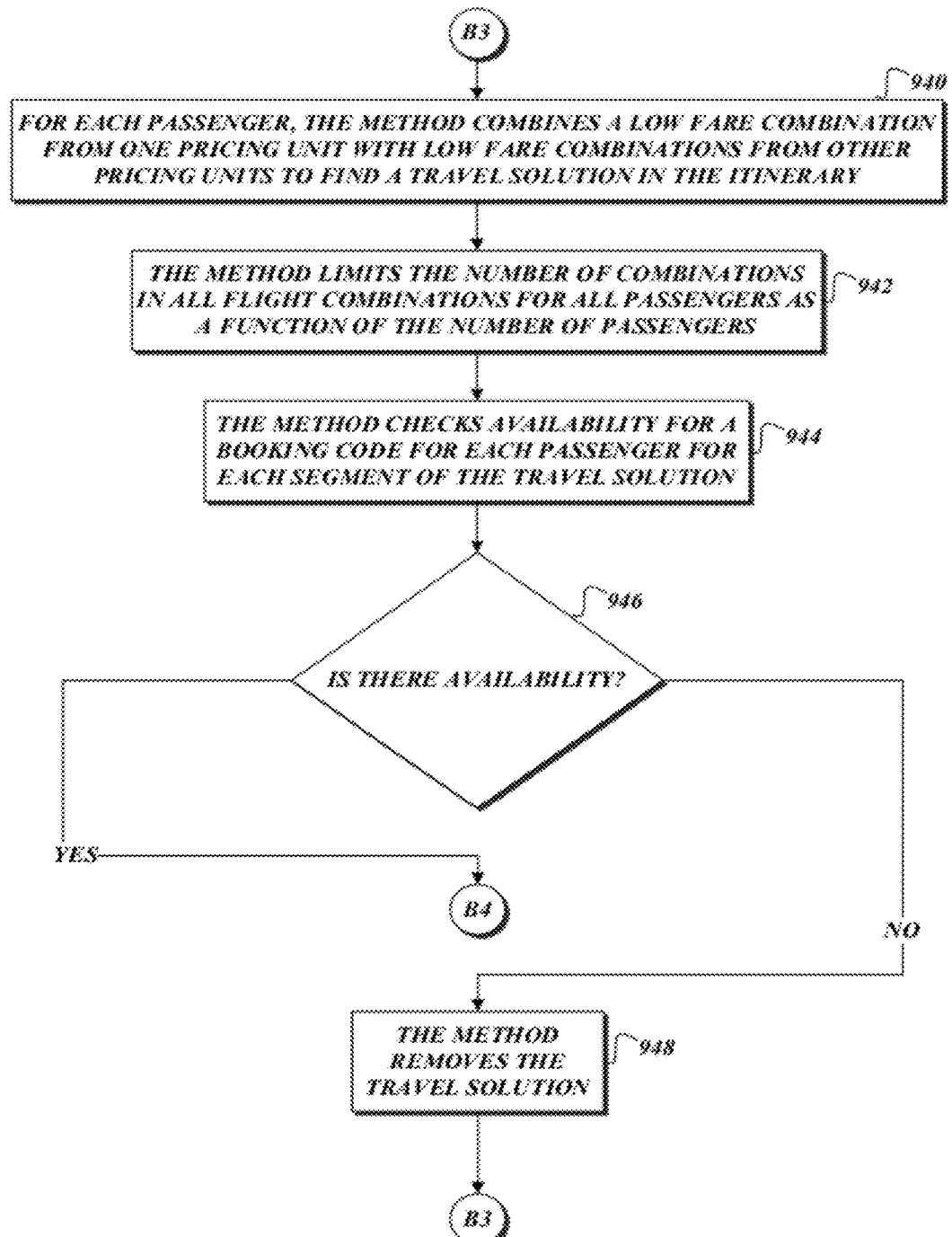
Figure 9E:
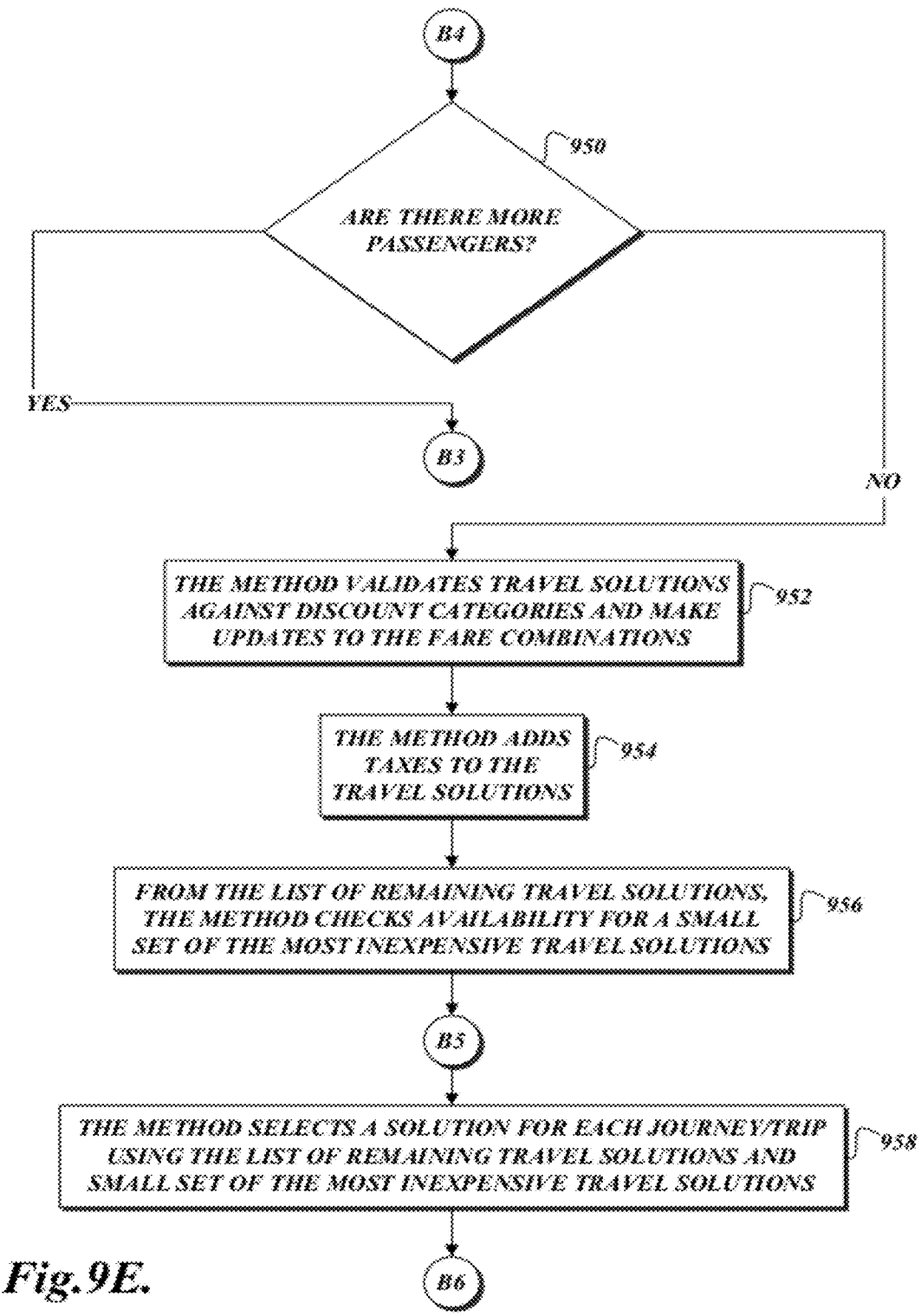
Figure 9F:
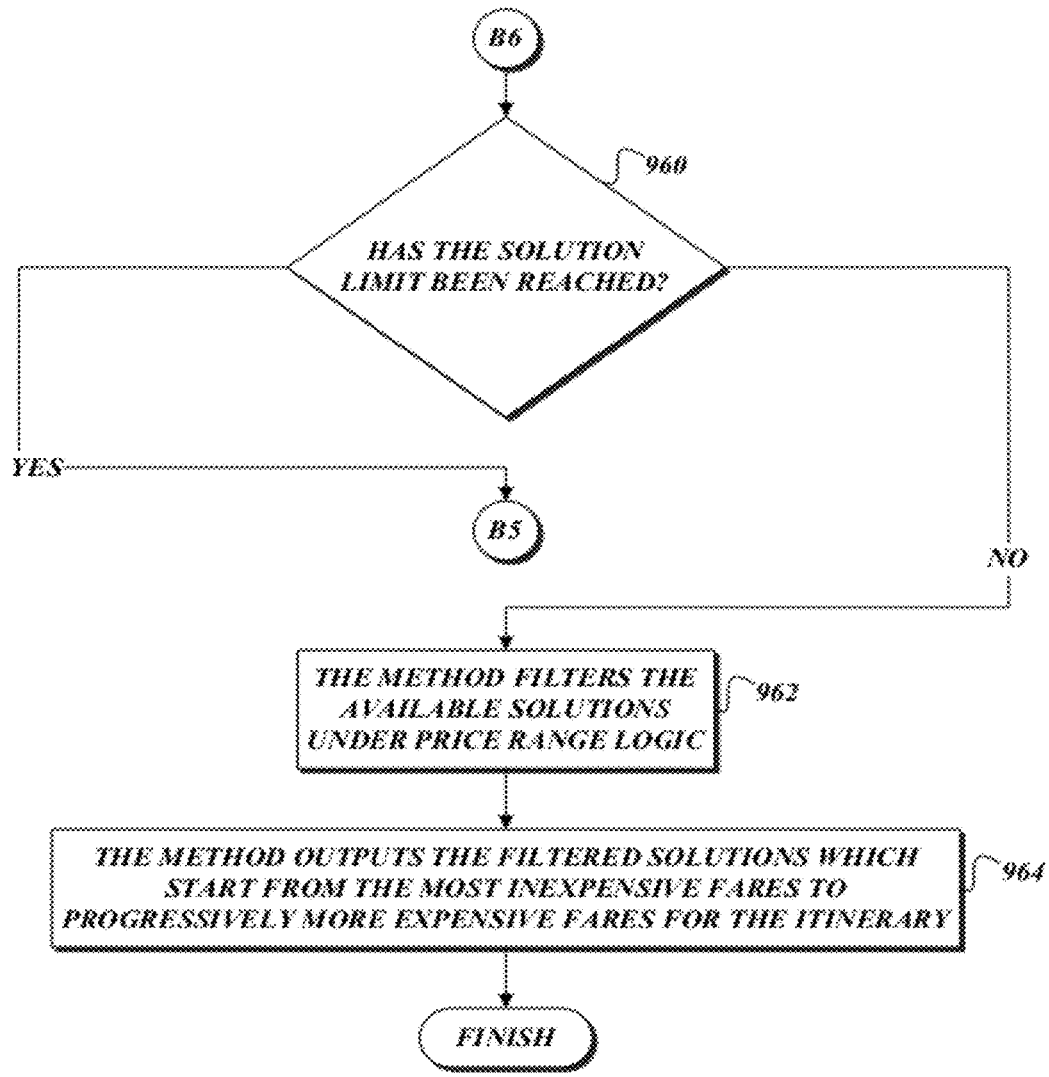
Figure 10:
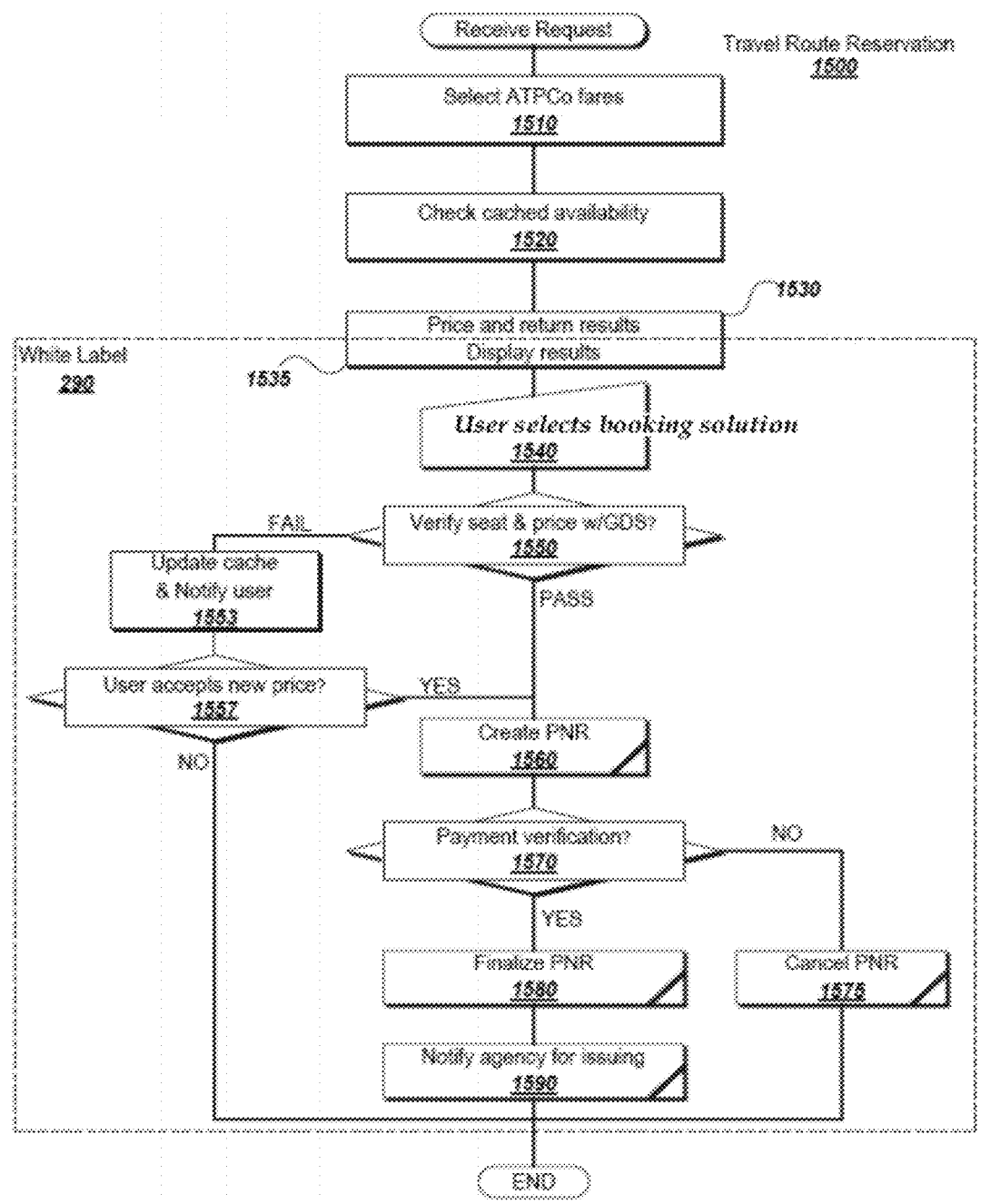
FIG. 10 shows a flow diagram for travel route reservation processing in accordance with one embodiment.

In subroutine block 1340, routine 1300 selects preferred routings, travel paths, and split points associated with the origination and/or destination of the received travel request. In one embodiment, routine 1300 retrieves information from precalculated data (e.g., 430, 530) including routings information from the routings database and split point information from the split point database pertaining to possible routings and split points for every city in the travel request. FIG. 7 discusses the output of the subroutine 1340 in greater detail.

Upon identifying the most likely travel paths, routine 1300 selects travel combinations that can cover the travel request in subroutine 1350. More specifically, subroutine 1350 limits the selected travel combinations to those routings with flights that are currently capable of covering travel particulars given in the travel request 1320 including travel dates, passenger quantity, and travel preferences. FIGS. 8A-8E discuss the subroutine 1350 in greater detail.

In subroutine 1360, routine 1300 selects the travel combinations identified by subroutine 1350 that exhibit the lowest fares. The size of this list may vary according to the original parameters of the received travel request 1320. Once the preliminary selections have been made, routine 1300 validates the selections against the rules and price requirements to determine whether the proposed travel request qualifies for the fare. In one embodiment, if a portion of the travel combination is discovered in subroutine 1370 to be invalid because that particular portion does not qualify for a specific fare, then an alternative substitute travel portion may be used. One embodiment requires that the cost of the substitute travel portion be less than or equal to the cost of the invalidated portion. If the substitute travel portion is cheaper than the invalidated portion, then the total fare price is recalculated for the new travel combination. In another embodiment, an invalid fare discovered in subroutine 1370 is removed from the selection list. This embodiment attempts to minimize calculations after the travel request has been made and assumes that one of the other possible fares selected in subroutine 1360 will include the cheapest valid fare. FIGS. 9A-9F discuss the subroutines 1360, 1370, in greater detail.

Upon validation, routine 1300 generates a list of priced itineraries 1380 from the remaining valid fares. The list of priced itineraries 1380 includes at least one travel option responsive to the travel request 1320. In one embodiment, the parameters of the list may be defined in part by the travel request 1320. Other parameters of the list may be dictated by the validated results from subroutine 1370. In block 1390, routine 1300 returns the list of priced itineraries 1380 to the traveler initiating the travel request 1320.

FIG. 7 shows pictorial diagrams illustrating example outputs of a routing process in accordance with one embodiment. For illustrative purposes only, FIG. 7 shows outputs of an exemplary query by a travel consumer who desires to travel from Chicago, Ill. (CHI), to Los Angeles, Calif. (LAX). The output of the routing module comprises pricing unit combinations, each with its fare components, each of which has its routings and fares identified.

The shape of the pricing units and their fare components are likely to differ from query to query. In each query, the routing output generates as many suitable mathematical shapes that are feasible and includes one shape comprised of one round trip fare and one shape comprised of two one-way fares in two separate pricing units. The shapes of the pricing units are illustrated by the pictorial diagrams of FIG. 7.

Diagrams 702-710 illustrate five distinct pricing unit combinations and shapes. These may be couched as "trips", "journeys", or "trips/journeys". In each journey the numbering of the pricing components (one way "OW", round trip "RT", open jaw "OJ") is indicative of the pricing unit in which they will be placed. For example, the diagram 708 represents two pricing units, each with its OJ fare component. To complete the journey, all pricing units are suitably validated. Whether the journey will result in a split ticket or not is determined at a later stage. Each of those journeys will have routing and fare combinations associated with it.

FIGS. 8A-8C and 8E illustrate a method for processing the flight selection module. From a starting block (FIG. 8A), a method 800 proceeds to block 802 where the method begins to generate flight combinations for a routing. The method continues to another continuation terminal ("terminal A1"). Next, at block 804, each trip/journey from the routing module is divided into blocks. The method then continues to another continuation terminal ("terminal A2"). Next, at block 806, each block contains a list of routings.

The method then continues to yet another continuation terminal ("terminal A3"). Proceeding to block 808, for each routing, a list of paths/routes is generated (suitably from shortest to longest) according to different carriers and cities. Continuing to block 810, the method receives flight schedule information from aviation databases, such as OAG. At block 812, a set of flight combinations is generated from each routing and each path, according to dates, schedules, carriers, and flight numbers. The method 800 then continues to yet another continuation terminal ("terminal A4").

From terminal A4 (FIG. 8B), the method 800 proceeds to decision block 814 where a test is performed to determine whether there are more routings within a block. If the answer to the test at decision block 814 is YES, the method 800 continues to terminal A3 and skips back to block 808 where the above-identified processing steps are repeated. Otherwise, if the answer to the test at decision block 814 is NO, the method continues to decision block 816 where another test is performed to determine whether there are more blocks within a trip/journey. If the answer to the test at decision block 816 is YES, the method continues to terminal A2 and skips back to block 806 where the above-identified processing steps are repeated. Otherwise, the answer to the test at decision block 816 is NO, and the method continues to decision block 818, where a further test is performed to determine whether there are more trips/journeys. If the answer to the test at decision block 818 is YES, the method continues to terminal A1 and skips back to block 804 where the above-identified processing steps are repeated. Otherwise, the answer to the test at decision block 818 is NO, and the method continues to a continuation terminal ("terminal A5").

From terminal A5 (FIG. 8C), the method 800 proceeds to block 820 where the method begins to sort flight combinations within each routing. The method then proceeds to a continuation terminal ("terminal A6"). At block 822, the method calculates a sorting coefficient, which is applied to each flight combination based on availability, travel time, number of connections, significant carrier, and carrier alliances. The method then continues to another continuation terminal ("terminal A8").

From terminal A8 (FIG. 8E), the method 800 proceeds to decision block 850 where a test is performed to determine whether there are more routings. If the answer to the test at decision block 850 is YES, the method continues to terminal A6 and skips back to block 822 where the above-identified processing steps are repeated. Otherwise, the answer to the test at decision block 850 is NO, and the method proceeds to block 852. At block 852, the method sorts the flight combinations according to their sorting coefficients. At block 854, the method begins to combine flight combinations among blocks. The flight combinations of routings among blocks are combined so that each combination of flight combinations has one flight combination from each block. See block 856. At block 858, travel limits, restrictions, and tolerances of flight combinations of one block are combined with other travel limits, restrictions, and tolerances of other blocks that then compose a trip/journey. The method then exits and terminates execution. At the exit, the output of the flight selection module is where a list of unique combinations of flight combinations for each routing combination is produced within each journey/trip. See FIG. 7.

FIGS. 9A-9F illustrate a method for processing fares validation. From a start block (FIG. 9A), a method 900 proceeds to block 902 where the method obtains from the routing module a list of routing combinations contained in each trip/journey. The method obtains from the flight module flight combinations within each routing combination. See block 904. At block 906, the method calculates a coefficient, which controls the maximum number of flight combinations within routing combinations for trips/journeys that will be allowed to the fare validation module. To keep diversity of routings and carriers, the maximum number of flight combinations is dependent on the increase in the number of routing combinations and flight combinations. See block 908. At block 910, the method loads fares for each fare component for each trip/journey from the airline tariff publishing company or from any suitable sources. The method 900 does not process fares which were found as not valid in the routing module. See block 912. At block 914, the method may elect to search specific discount fares. The method then continues to another continuation terminal ("terminal B1").

From terminal B1 (FIG. 9B), the method 900 finds a specific booking code (reservation/booking designator "RBD") and checks for its availability. See block 916. At block 918, the method queries the availability server, which, in one embodiment, uses prediction logic to check availability. Proceeding to block 920, if there is no response to the query, the method reaches out to an external data source, such as a computer reservation system, to get availability information. The method then continues to decision block 922 where a test is performed to determine whether there is availability information. If the answer to the test at decision block 922 is YES, the method 900 continues to another continuation terminal ("terminal B2"). Otherwise, the answer to the test at decision block 922 is NO, and the method proceeds to block 924 where it removes the fare because there is no seat availability for the fare booking code for one of the flights in the combination. The method then continues to terminal B2.

From terminal B2 (FIG. 9C), the method validates fares against fare component level categories. See block 926. At block 928, the method validates fares against passenger categories for each passenger. The method searches each pricing unit for a list of air components, each of which has a list of valid fares. See block 930. Within each pricing unit, combinations of fares are created where each fare combination has one fare for each fare component, up to a predetermined maximum amount. See block 932. At block 934, the method validates fares against pricing unit categories. Proceeding to block 936, the method attaches a list with validated pricing units to each passenger in an itinerary. Next, at block 938, the method searches passengers for a list of different pricing units and further searches each of the pricing units for fare combinations. The method then continues to a continuation terminal ("terminal B3").

From terminal B3 (FIG. 9D), the method 900 proceeds to block 940 where, for each passenger, the method combines a low fare combination from one pricing unit with low fare combinations from other pricing units to find a travel solution in the itinerary. Proceeding to block 942, the method limits the number of combinations in all flight combinations for all passengers as a function of the number of passengers. The method checks availability for a booking code for each passenger for each segment of the travel solution. See block 944. Proceeding to decision block 946, a test is performed to determine whether there is availability. If the answer to the test at decision block 946 is YES, the method proceeds to another continuation terminal ("terminal B4"). Otherwise, the answer to the test at decision block 946 is NO, and the method proceeds to block 948 where the method removes the travel solution. The method then continues to terminal B3 and skips back to block 940 where the above-identified processing steps are repeated.

From terminal B4 (FIG. 9E), the method proceeds to decision block 950 where another test is performed to determine whether there are more passengers. If the answer to the test at decision block 950 is YES, the method continues to terminal B3 and skips back to block 940 where the above-identified processing steps are repeated. Otherwise, the answer to the test at decision block 950 is NO, and the method proceeds to block 952 where the method validates travel solutions against discount categories and makes updates to the fare combinations. The method then adds taxes to the travel solutions. See block 954. At block 956, from the list of remaining validated travel solutions, the method checks availability for a small set of the most inexpensive travel solutions. The method then continues to another continuation terminal ("terminal B5"). Proceeding to block 958, the method selects a solution for each journey/trip using the list of remaining travel solutions and a small set of the most inexpensive travel solutions. One suitable small set includes five travel solutions that are the most inexpensive travel solutions. The method then continues to another continuation terminal ("terminal B6").

From terminal B6 (FIG. 9F), the method continues to decision block 960 where a test is performed to determine whether the solution limit has been reached. If the answer to the test at decision block 960 is YES, the method proceeds to terminal B5 and skips back to block 958 where the above-identified processing steps are repeated. Otherwise, the answer to the test at decision block 960 is NO, and the method proceeds to block 962 where the method filters the available solutions under price range logic. Proceeding to block 964, the method outputs the filtered solutions which start from the most inexpensive fares to progressively more expensive fares for the itinerary, or by any other suitable filters, such as flight times or connection preferences. The method then enters an exit terminal and terminates execution.

Referring now to FIG. 15, a flow diagram for a travel route reservation process is shown in accordance with one embodiment. The travel route reservation process routine 1500 selects the most suitable ATPCO fares in block 1510 in accordance with the received parameters of the travel request. Availability of a selected fare is checked in block 1520 by routine 1500 against cached fare availability data typically managed by an availability server (see, e.g., 150 or 570). In one embodiment, the top results exhibiting real availability are priced and returned in block 1530 by routine 1500. Accordingly, the remaining price travel search results may then be displayed to the user in block 1535 by routine 1500.

If the displayed results are agreeable to the user, then a booking solution may be selected by the user in block 1540. Once routine 1500 obtains a fare selection in block 1540, the selected fare is validated in query block 1550 by verifying seat availability and price. If the selected fare is validated, routine 1500 creates a Passenger Name Record (PNR) in block 1560 in the database of a CRS that contains the itinerary for a passenger, or a group of passengers traveling together. Otherwise routine 1500 updates the availability cache. In one embodiment, if an alternative price is available for the selected fare, routine 1500 may optionally include the new price when notifying the user. If the new price is accepted by the user in query block 1557, routine 1500 creates a PNR in block 1560. If the new price is not accepted in query block 1557, routine 1500 ends. In one embodiment, after removing the invalid selection, routine 1500 optionally returns to the remaining search results in block 1530 to enable the user an opportunity to select another fare. Once a PNR has been created for the selected fare, routine 1500 verifies payment in query block 1570. If payment cannot be verified, routine 1500 cancels the PNR in block 1575 that was originally created in block 1560. Otherwise routine 1500 finalizes the PNR in block 1580 and notifies the agency to issue a ticket for the purchased fare.

Upon returning the priced results in block 1530, in one embodiment, routine 1500 may enter an optional private label or white label module 290 where the travel search results of the travel server may be rebranded by a marketer's to appear as if the travel results originated from the marketer site. This rebranding process may enable a successful brand to offer an online travel option identification and reservation processing service without having to invest in creating the search optimization technology and associated infrastructure. The travel server may also adjust the scope of search according to the source originating the travel request. For example, if an airline carrier redirects a potential passenger to the routing search engine, then the travel server may restrict the scope of the initial search to routings directly corresponding to the airline carrier. In one embodiment, the scope of the search may also be expanded to include alliance affiliates of the airline carrier, so the search results may be expanded from the flights offered by the carrier but still limited to flights operated by the airline carrier and/or alliance affiliates of the airline carrier. In another embodiment, travel consolidators may wish to repackage the travel results in accordance with their brand image.

While illustrative embodiments have been illustrated and described, it will be appreciated that various changes can be made therein without departing from the spirit and scope of the subject matter.

The invention claimed is:

1. A method comprising:
computing, by a processor node associated with a computer, split points between originations and destinations in advance of a travel request and without selecting flights that have available seats on them, thereby reducing the computations needed at the time the travel request is actually made;
storing, by the processor node, the computed split points in a split point database;
obtaining, by a search node associated with the computer, the travel request having at least one origination and at least one destination;
creating, by a routing module associated with the search node, at least one theoretical travel path for a travel itinerary based on the travel request, wherein the theoretical travel path includes:
a first travel template having a first type of pricing unit;
a second travel template having a second type of pricing unit different from the first type of pricing unit; and
a split point placeholder;
generating, by a travel module associated with the search node, travel combinations based on travel routings associated with each theoretical travel path, wherein generating includes using computed split points from the split point database between the origination and the destination to replace the split point placeholder; and
providing a list of valid travel itinerary options from the travel combinations in response to the travel request.

2. The method of claim 1, wherein the types of pricing units include at least one circle trip (CT3, CT4) template and at least one of One Way (OW) templates, Round Trip (RT)

templates, Origination Open Jaw (OOJ) templates, Destination Open Jaw (DOJ) templates, and Open Departure Open Jaw (ODOJ) templates.

3. The method of claim 1, wherein each travel template provides the routing module with building information for theoretical travel paths from a routing database that includes suitable routings and fares.

4. The method of claim 1, further comprising validating, by a fare validation module, each pre calculated routing of a unique travel combination.

5. The method of claim 4, wherein the validating includes checking, by the fare validation module, availability of each travel combination.

6. The method of claim 1, wherein the generating includes correlating, by the routing module, the unique travel routings into at least one unique travel combination for each theoretical travel path.

7. The method of claim 1, further comprising sorting, by the travel module, the travel combinations in accordance with travel parameters associated with the travel request.

8. The method of claim 7, wherein sorting includes selecting a most reliable travel combination.

9. The method of claim 7, wherein sorting includes selecting travel combinations matching traveler parameters of a traveler originating the travel request.

10. The method of claim 1, wherein computing includes obtaining pre-calculated fares associated with each pre-calculated routing and determining includes selecting price travel routings based on the pre-calculated fares associated with each pre-calculated routing.

11. The method of claim 1, further comprising:
calculating, by the routing module, a path price representing a minimum cost for each of the theoretical paths by combining costs of each of the travel routings in a respective travel combination, travel routing cost being based on pre-calculated fares associated with each pre-calculated routing; and
obtaining, by a fares validation module associated with the computer, a set of valid fares associated with each travel routing in a respective travel combination and determining whether the calculated path price matches available seats for each respective travel combination.

12. The method of claim 11, wherein the calculated path price includes tax information from a tax database to calculate a more accurate total travel price using taxes assessed along the respective travel combination.

13. The method of claim 11, wherein the obtaining, by the fares validation module, includes validating a fare associated with a specific booking code for each travel routing in a respective travel combination and further comprises checking, by the fares validation module, seat availability of each fare and selecting only the cheapest valid fare with free seats in a respective travel combination.

14. The method of claim 11, wherein the calculated path price for each respective travel combination includes a total cost value, calculated in the travel module, that adds the path price to estimated extra costs, the estimated extra costs including lodging, transportation, and meal price estimates.

15. The method of claim 14, wherein the estimated extra costs are calculated in the travel module based on whether the respective travel combination includes overnight layovers, long layovers, or changes in airports within a designated city.

16. The method of claim 11, wherein the providing the list includes sorting the travel itinerary options by the relative valid calculated path price of each respective travel combination.

17. The method of claim 1, wherein each split point has at least two connecting segments, an incoming segment and an outgoing segment.

18. A non-transient computer-readable medium having tangibly stored thereon instructions that when executed by a processor of a computer, cause the computer to perform actions comprising:
pre-calculating, by a processor node associated with the computer, split points between originations and destinations in advance of a travel request made to a travel planning system, thereby reducing the computations needed at the time the travel request is actually made;
storing, by the processor node, the pre-calculated split points in a split point database;
obtaining, by a search node associated with the computer, the travel request having at least one origination and at least one destination;
creating, by a routing module associated with the search node, at least one theoretical travel path for a travel itinerary based on the travel request, wherein the theoretical travel path includes:
a first travel template having a first type of pricing unit;
a second travel template having a second type of pricing unit different from the first type of pricing unit; and
a split point placeholder;
generating, by a travel module associated with the search node, travel combinations based on travel routings associated with each theoretical travel path, wherein generating includes using pre-calculated split points from the split point database between the origination and the destination to replace the split point placeholder; and
providing a list of valid travel itinerary options from the travel combinations in response to the travel request.

19. A computing system, comprising:
at least one computing device configured to provide a split point database;
at least one front-end server computing device; and
at least one back-end server computing device;
wherein the at least one front-end server computing device is configured to:
receive a travel request, the travel request having at least one origination and at least one destination;
wherein the at least one back-end server computing device is configured to:
pre-calculate, by a processor node associated with the at least one back-end server computing device, theoretical travel paths in advance of a travel request being received by the at least one front-end server computing device, thereby reducing the computations needed at the time the travel request is actually made; and
store, by the processor node, the pre-calculated split points in the split point database;
obtain, by a search node associated with the at least one back-end server computing device, the travel request from the at least one front-end server computing device;
create, by a routing module associated with the search node, at least one theoretical travel path for a travel itinerary based on the travel request, wherein the theoretical travel path includes:
a first travel template having a first type of pricing unit;

a second travel template having a second type of pricing unit different from the first type of pricing unit; and a split point placeholder;

generate, by a travel module associated with the search node, travel combinations based on travel routings associated with each theoretical travel path, wherein generating includes using pre-calculated split points from the split point database between the origination and the destination to replace the split point placeholder; and provide to the at least one front-end server computing device a list of valid travel itinerary options from the travel combinations in response to the travel request.

20. The computing system of claim 19, wherein the at least one back-end server computing device is further configured to temporarily allocate additional computing power for use during the pre-calculation of the theoretical travel paths.

21. The computing system of claim 19, wherein the at least one front-end server computing device is configured to activate an additional front-end server computing device in response to an increase in a number of users making travel requests.

* * * * *